(12) United States Patent
Yang et al.

(10) Patent No.: US 12,477,677 B2
(45) Date of Patent: Nov. 18, 2025

(54) PARALLEL MODULE DRIVER

(71) Applicant: Delta Electronics, Inc., Taoyuan (TW)

(72) Inventors: Ching-Chi Yang, Taoyuan (TW);
Hsien-Chung Lee, Taoyuan (TW);
Kai-Ti Chang, Taoyuan (TW);
Sheng-Chih Tsai, Taoyuan (TW);
Tzu-Sen Hung, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 239 days.

(21) Appl. No.: 18/209,385

(22) Filed: Jun. 13, 2023

(65) Prior Publication Data

US 2024/0334634 A1  Oct. 3, 2024

(30) Foreign Application Priority Data

Mar. 31, 2023 (CN) .......................... 202310339415.0

(51) Int. Cl.
*H05K 7/02* (2006.01)
*H01R 12/71* (2011.01)
(Continued)

(52) U.S. Cl.
CPC ............. *H05K 7/023* (2013.01); *H01R 31/06* (2013.01); *H02M 1/00* (2013.01); *H02M 7/003* (2013.01);
(Continued)

(58) Field of Classification Search
CPC .. H05K 7/023; H05K 7/14324; H05K 5/0217; H05K 5/0256; H05K 7/1457;
(Continued)

(56) References Cited

U.S. PATENT DOCUMENTS 3,991,346 A * 11/1976 Reid .................... H05K 7/1452
439/83
4,307,927 A * 12/1981 Mollman ............. H01R 13/645
439/681
(Continued)

FOREIGN PATENT DOCUMENTS

CN  211321689 U  8/2020
CN  211456062 U  9/2020
(Continued)

*Primary Examiner* — Rockshana D Chowdhury
*Assistant Examiner* — Martin Antonio Asmat Uceda
(74) *Attorney, Agent, or Firm* — KIRTON McCONKIE; Evan R. Witt

(57) ABSTRACT

A parallel module driver is disclosed and includes a modular backplane structure, a rectifier module and an inverter module. The modular backplane structure includes a plurality of connectors arranged equidistantly in a first direction. The rectifier module includes a rectifier-connection slot connected to one of the plurality of connectors in a second direction. The inverter module includes an inverter-connection slot connected to one of the plurality of connectors in the second direction. The rectifier module and the inverter module are arranged adjacent to each other, the rectifier-connection slot and the inverter-connection slot are connected to two adjacent connectors on the modular backplane structure, respectively. The lateral sides of the rectifier module and the inverter module are attached to each other, and respectively include a guiding element and a guiding groove matched with each other and limiting the rectifier module and the inverter module to slide in the second direction.

14 Claims, 16 Drawing Sheets

(51) Int. Cl.
*H01R 31/06* (2006.01)
*H02M 1/00* (2007.01)
*H02M 7/00* (2006.01)
*H05K 5/02* (2006.01)
*H05K 7/14* (2006.01)

(52) U.S. Cl.
CPC ......... *H05K 5/0217* (2013.01); *H05K 5/0256* (2013.01); *H05K 7/14324* (2022.08); *H05K 7/1457* (2013.01); *H01R 12/716* (2013.01)

(58) Field of Classification Search
CPC ....... H01R 31/06; H01R 12/716; H02M 1/00; H02M 7/003; H02B 1/01
See application file for complete search history.

(56) References Cited

U.S. PATENT DOCUMENTS

| | | | | | |
|---|---|---|---|---|---|
| 4,680,674 | A | * | 7/1987 | Moore | G06F 1/1632 361/744 |
| 4,685,032 | A | * | 8/1987 | Blomstedt | H05K 7/1457 361/624 |
| 4,691,296 | A | * | 9/1987 | Struger | G05B 19/054 710/2 |
| 4,738,632 | A | * | 4/1988 | Schmidt | H05K 7/1465 439/341 |
| 4,899,254 | A | * | 2/1990 | Ferchau | G06F 1/20 439/246 |
| 5,128,830 | A | * | 7/1992 | Deluca | H05K 7/1454 361/752 |
| 5,313,369 | A | * | 5/1994 | Lewis | H05K 7/1425 361/752 |
| 5,623,173 | A | * | 4/1997 | Fasullo | H02M 7/003 307/18 |
| 5,827,074 | A | * | 10/1998 | Gatti | H05K 1/14 439/61 |
| 6,040,982 | A | * | 3/2000 | Gandre | G06F 1/188 307/64 |
| 6,175,503 | B1 | * | 1/2001 | Hogan | H05K 7/186 361/733 |
| 6,501,659 | B1 | * | 12/2002 | Bodensteiner | G06F 1/16 361/728 |
| 6,881,101 | B2 | * | 4/2005 | Sichner | H05K 5/069 439/732 |
| 6,987,670 | B2 | * | 1/2006 | Ahmed | H01L 25/072 257/E23.114 |
| 7,035,115 | B2 | * | 4/2006 | Walesa | H05K 7/1457 361/732 |
| 7,109,603 | B2 | * | 9/2006 | Wise, Jr. | H02J 1/102 307/28 |
| 7,132,833 | B2 | * | 11/2006 | Layden | H02J 7/0029 324/429 |
| 7,396,247 | B2 | * | 7/2008 | Lin | H05K 7/1417 439/76.1 |
| 7,499,286 | B2 | * | 3/2009 | Berke | H05K 7/1487 361/756 |
| 7,791,865 | B2 | * | 9/2010 | Wirtzberger | H05K 7/1457 361/728 |
| 8,295,059 | B1 | * | 10/2012 | Conroy | G08G 1/095 361/796 |
| 8,400,440 | B2 | * | 3/2013 | Takenaka | G02F 1/13452 345/206 |
| 8,488,319 | B2 | * | 7/2013 | Santos | H02M 7/003 363/141 |
| 8,498,309 | B2 | * | 7/2013 | Campini | H04Q 1/03 361/725 |
| 8,542,485 | B2 | * | 9/2013 | Nemoz | H05K 7/20672 454/184 |
| 8,861,975 | B2 | * | 10/2014 | Pitwon | H04B 10/801 33/12 |
| 9,225,102 | B1 | * | 12/2015 | Larsen | H04Q 3/42 |
| 9,456,526 | B2 | * | 9/2016 | Mann | H05K 7/1445 |
| 9,474,181 | B2 | * | 10/2016 | Bailey | G06F 1/26 |
| 9,491,895 | B2 | * | 11/2016 | Steeves | H05K 13/04 |
| 9,526,189 | B2 | * | 12/2016 | Weiss | H05K 7/1474 |
| 10,128,612 | B1 | * | 11/2018 | Casto | H05K 5/30 |
| 10,784,656 | B2 | * | 9/2020 | Roberts | H02G 5/025 |
| 11,108,111 | B2 | * | 8/2021 | Lindstrom | H01M 10/6551 |
| 11,150,510 | B2 | * | 10/2021 | Tang | G02F 1/133608 |
| 11,239,521 | B2 | * | 2/2022 | Murphy | H01M 50/242 |
| 11,991,861 | B2 | * | 5/2024 | Gurlt | H05K 7/1475 |
| 2006/0220201 | A1 | * | 10/2006 | Liu | G11C 5/04 257/679 |
| 2007/0025095 | A1 | | 2/2007 | Beall et al. | |
| 2007/0217170 | A1 | * | 9/2007 | Yeap | G01R 1/04 361/752 |
| 2013/0271935 | A1 | * | 10/2013 | Kiew | H05K 5/0217 361/753 |
| 2015/0092788 | A1 | | 4/2015 | Kennedy et al. | |

FOREIGN PATENT DOCUMENTS

| | | |
|---|---|---|
| CN | 213817558 U | 7/2021 |
| TW | 394417 U | 6/2000 |
| TW | 201621532 A | 6/2016 |
| TW | M561821 U | 6/2018 |
| TW | M588394 U | 12/2019 |
| TW | I683610 B | 1/2020 |
| WO | 2019008032 A1 | 1/2019 |
| WO | 2020144209 A1 | 7/2020 |

\* cited by examiner

PARALLEL MODULE DRIVER

CROSS-REFERENCE TO RELATED APPLICATION

This application claims priority to China Patent Application No. 202310339415.0, filed on Mar. 31, 2023. The entire contents of the above-mentioned patent application are incorporated herein by reference for all purposes.

FIELD OF THE INVENTION

The present disclosure relates to an electronic assembly structure, and more particularly to a modular backplane structure and a parallel module driver using the same. It allows to assemble and disassemble book-type modules and the modular backplane structures in the same single direction, so that the space utilization of electric control cabinet or equipment is increased effectively.

BACKGROUND OF THE INVENTION

A conventional parallel module driver includes for example the inverter module and the rectifier module arranged side by side in a single direction. That is, the inverter module and the rectifier module are inserted horizontally on a base for expandable installation, and electrically connected through a connector disposed in the base. However, although the main body of the inverter module or the rectifier module can be quickly installed on or disassembled from the base, if the base is damaged, it must be disassembled and overhauled one by one. Furthermore, the cabinet of equipment manufacturer is full of different electrical equipment and wiring, and the disassembly and assembly directions of damaged modules are easily restricted. It is difficult to obtain a suitable position for applying force, and not friendly to the operations of customer.

For the cabinet of equipment manufacturer, the space utilization rate is regarded as one of the product competitiveness indicators. When the main body of the conventional inverter module is disassembled by rotation manner, a reserved space in the cabinet of equipment manufacturer has to be provided in the rotation path for disassembling, and it results in waste of space. Furthermore, when the main body of the inverter module is assembled back to the base, there is no structural alignment mechanism. The customers need to blindly mate and align the inverter module to the connector of the base, so that the connector on base is vulnerable to damage from collision. It is user-unfriendly and not reliable enough.

On the other hand, the connection between the modules is implemented through the docking and mounting of the connector. When the vibration environment is bad or the module is subjected to force to generate vibration or collision, the terminal platform of the connector is easy to wear and damage. In addition, the locking position is far away from the front end of the module. The moment arm effect caused by the vibration and the weight difference between the modules will produce different vibration modes, and it will cause the modules to collide with each other. The risk of dropping or loosening the components is increase, and even the machine is blown up.

In addition, the parallel structure of the parallel module driver is powered by the rectifier module, and then the electrical signal is transmitted to the inverter module through the connector. The more inverter modules are expanded on one side, the longer the electrical signal transmission path is, and the less stable the electrical signal transmission is. Therefore, the number of unilateral horizontal expansion architectures is limited.

There are also legal requirements for the continuity of the system grounding. The impedance from the ground point of the rectifier module to the ground point (farthest) of the inverter module must be less than the regulations and standards. If the rectifier module and the inverter module are connected through the pins and the clips of the connectors, it will easily lead to higher resistance. The more modules are expanded, the higher the risk that the grounding continuity cannot meet the regulations.

Therefore, there is a need of providing a modular backplane structure and a parallel module driver using the same, so as to obviate the drawbacks encountered by the prior arts.

SUMMARY OF THE INVENTION

An object of the present disclosure is to provide a modular backplane structure and a parallel module driver using the same. The installation and the assembly of the modular backplane structure are limited in a single direction. Furthermore, the rectifier module and inverter module are designed as book-type parallel modules, which are allowed to be plugged into or disassembled from the modular backplane structure in the same single direction, so that the space utilization of electric control cabinet or equipment is increased effectively.

Another object of the present disclosure is to provide a modular backplane structure and a parallel module driver using the same. The modular backplane structure includes a plurality of connectors arranged thereon equidistantly in a first direction. It allows to combine more than two modular backplane structures with each other in the first direction, and then the equidistant arrangements of the plurality of connectors on two modular backplane structure are maintained. Corresponding to the plurality of connectors on the modular backplane structure, the sizes of at least one rectifier module and at least one inverter module are designed to have multiple relationships with the distance between two adjacent connectors in the first direction, so that it allows to install and connect the rectifier module and the inverter module to any two adjacent connectors of the modular backplane structure along a second direction, so as to form a parallel module driver arranged in the first direction. Furthermore, each of the rectifier module and the inverter module can be individually disassembled or replaced along the second direction. The inverter modules are arranged on one side or both sides of the rectifier module in the first direction for parallel expansion, and the number of modules is not limited.

A further object of the present disclosure is to provide a modular backplane structure and a parallel module driver using the same. The modular backplane structure includes a base, a circuit board and an outer cover. The circuit board includes a plurality of connectors partially protruding through the outer cover for connecting the rectifier module and the inverter module to form a parallel module driver. The rectifier module and the inverter module are electrically connected through the circuit board and the connectors, and it facilitates to reduce the electrical impedance increased due to assembling.

In accordance with an aspect of the present disclosure, a parallel module driver is provided which including a modular backplane structure, at least one rectifier module and at least one inverter module. The modular backplane structure includes a first backplane-lateral-side, a second backplanelateral-side, a first surface, a second surface and a plurality of connectors. The first backplane-lateral-side and the second backplane-lateral-side are opposite to each other in a first direction. The first surface and the second surface are opposite to each other in a second direction. The plurality of connectors are disposed on the first surface and arranged equidistantly in the first direction. The at least one rectifier module includes a first rectifier-lateral-side, a second rectifier-lateral-side, a rectifier-connection slot, a rectifier-guiding element and a rectifier-guiding groove. The first rectifier-lateral-side and the second rectifier-lateral-side are opposite to each other in the first direction, and the rectifier-connection slot is disposed on a rear surface of the rectifier module and located between the first rectifier-lateral-side and the second rectifier-lateral-side, and configured to dock with one of the connectors along the second direction. The at least one inverter module includes a first inverter-lateral-side, a second inverter-lateral-side, an inverter-connection slot, an inverter-guiding element and an inverter-guiding groove. The first inverter-lateral-side and the second inverter-lateral-side are opposite to each other in the first direction, and the inverter-connection slot is disposed on a rear surface of the inverter module and located between the first inverter-lateral-side and the second inverter-lateral-side, and configured to dock with one of the connectors along the second direction. One of the at least one rectifier module and one of the at least one inverter module are disposed adjacent to each other. The rectifier-connection slot and the inverter-connection slot corresponding thereto are connected to two adjacent ones of the plurality of connectors on the modular backplane structure, respectively. The first rectifier-lateral-side and the second inverter-lateral-side are attached to each other, or the second rectifier-lateral-side and the first inverter-lateral-side are attached to each other. The rectifier-guiding element and the rectifier-guiding groove are disposed on the first rectifier-lateral-side and the second rectifier-lateral-side, respectively, and extended along the second direction. The inverter-guiding element and the inverter-guiding groove are disposed on the first inverter-lateral-side and the second inverter-lateral-side, respectively, and extended along the second direction. The rectifier-guiding element is matched with the inverter-guiding groove or the rectifier-guiding groove is matched with the inverter-guiding element, so as to limit the rectifier module and the inverter module to assemble and slide in the second direction.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1B:
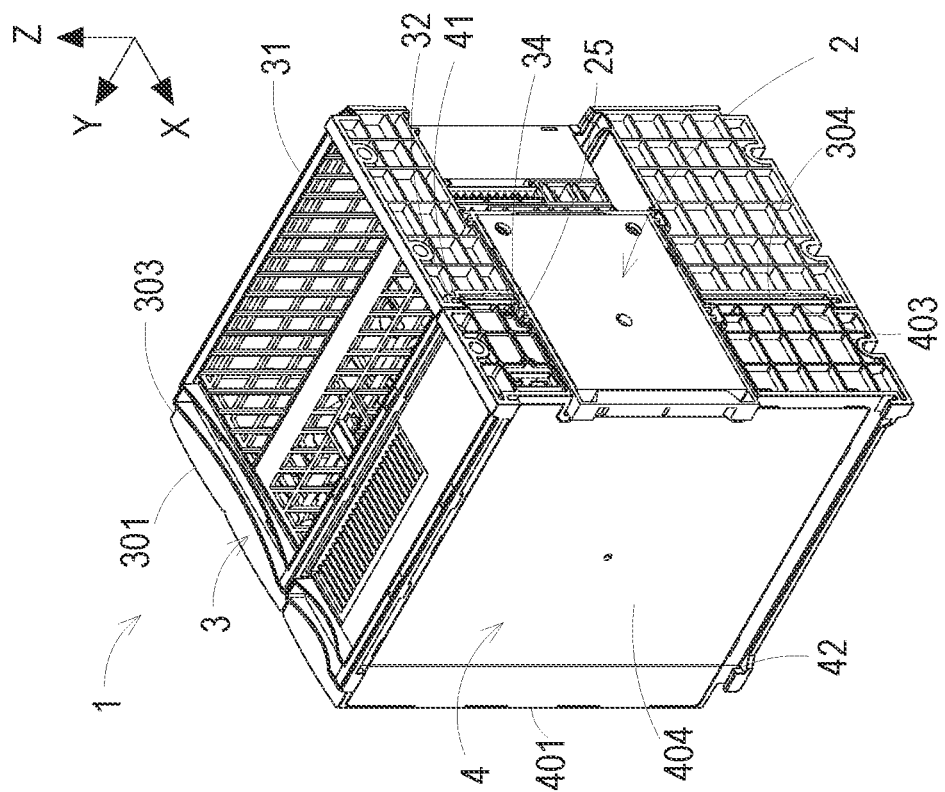
FIGS. 1A and 1B are perspective structural views illustrating a parallel module driver according to a first embodiment of the present disclosure.

Please refer to FIGS. 1A to 2B. In the embodiment, a parallel module driver 1 is provided in the present disclosure and includes a modular backplane structure 2, at least one rectifier module 3 and at least one inverter module 4. The modular backplane structure 2 includes a first backplane-lateral-side 203, a second backplane-lateral-side 204, a first surface 201, a second surface 202 and a plurality of connectors 24. The first backplane-lateral-side 203 and the second backplane-lateral-side 204 are opposite to each other in a first direction, such as the X axial direction. The first surface 201 and the second surface 202 are opposite to each other in a second direction, such as the Y axial direction. The plurality of connectors 24 are arranged equidistantly and disposed on the first surface 201 in the first direction (i.e., the X axial direction), and partially protruding through the first surface 201. In the embodiment, two or more modular backplane structures 2 are allowed to be spliced with each other in the second direction (i.e., the Y axial direction) by the first backplane-lateral-side 203 and the second backplane-lateral-side 204, so that the two or more modular backplane structures 2 (Referring to FIG. 13) are extended in the first direction (i.e., the X axial direction). The structure of the modular backplane structure 2 will be described in detail later.

In the embodiment, each of the at least one rectifier module 3 includes a first rectifier-lateral-side 303, a second rectifier-lateral-side 304 and a rectifier-connection slot 33. The first rectifier-lateral-side 303 and the second rectifier-lateral-side 304 are opposite to each other in the first direction (i.e., the X axial direction), and the rectifier-connection slot 33 is disposed on a rear surface 302 of the rectifier module 3 and located between the first rectifier-lateral-side 303 and the second rectifier-lateral-side 304, and configured to dock with one of the connectors 24 of the modular backplane structure 2 along the second direction (i.e., the Y axial direction). The rectifier module 3 includes the accessories such as input ports and a control panel arranged on a front surface 301 of the rectifier module 3 for users to operate.

In the embodiment, each of the at least one inverter module 4 includes a first inverter-lateral-side 403, a second inverter-lateral-side 404, an inverter-connection slot 43. The first inverter-lateral-side 403 and the second inverter-lateral-side 404 are opposite to each other in the first direction (i.e., the X axial direction), and the inverter-connection slot 43 is disposed on a rear surface 402 of the inverter module 4 and located between the first inverter-lateral-side 403 and the second inverter-lateral-side 404, and configured to dock with one of the connectors 24 along the second direction (i.e., the Y axial direction). The inverter module 4 includes the accessories such as output ports disposed on the front surface 401 for users to operate.

Notably, in the embodiment, one of the at least one rectifier module 3 and one of the at least one inverter module 4 are disposed adjacent to each other. The rectifier-connection slot 33 and the inverter-connection slot 43 corresponding thereto are connected to two adjacent ones of the plurality of connectors 24 on the modular backplane structure 2, respectively. The second rectifier-lateral-side 304 and the first inverter-lateral-side 403 are attached to each other. In other embodiments, the inverter module 4 is attached to the other side of the rectifier module 3, so that the first rectifier-lateral-side 303 of the rectifier module 3 and the second inverter-lateral-side 404 of the inverter module 4 are attached to each other.

Figure 3:
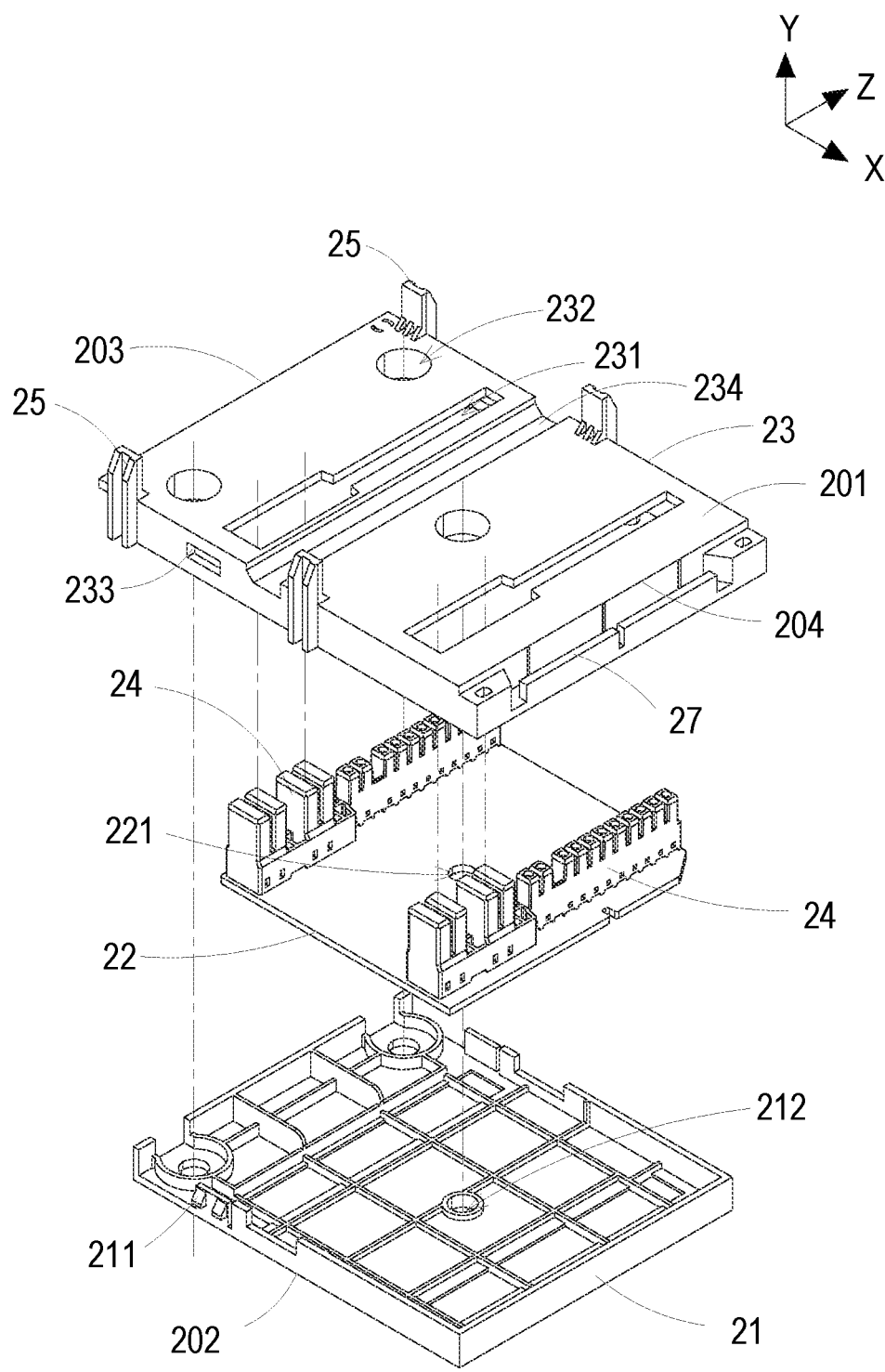
FIG. 3 is an exploded view illustrating the modular backplane structure according to the first embodiment of the present disclosure.
Figure 4A:
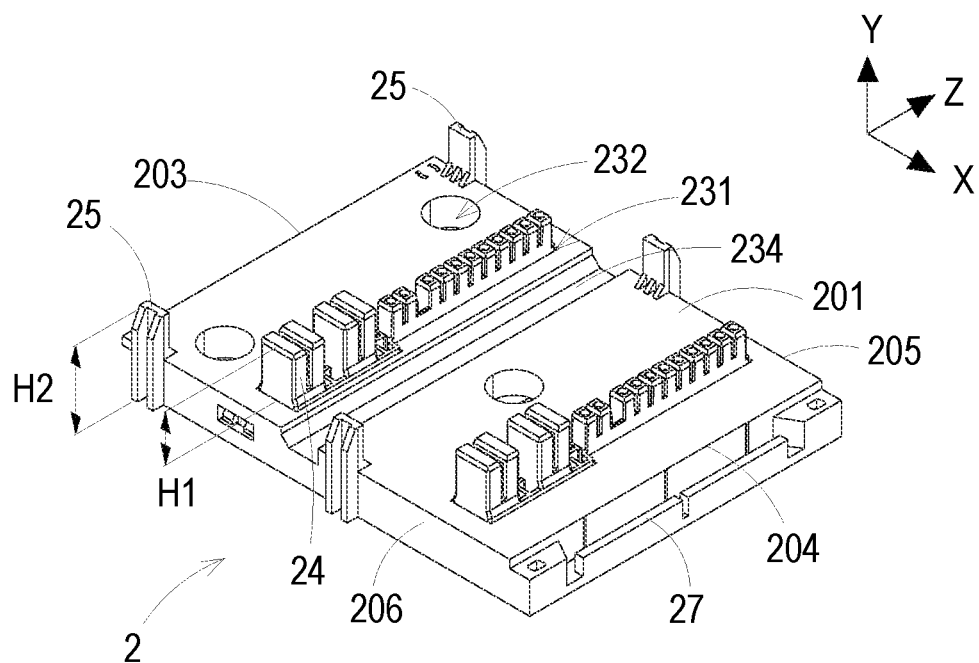
FIGS. 4A and 4B are perspective structural views illustrating the modular backplane structure according to the first embodiment of the present disclosure.
Figure 4B:
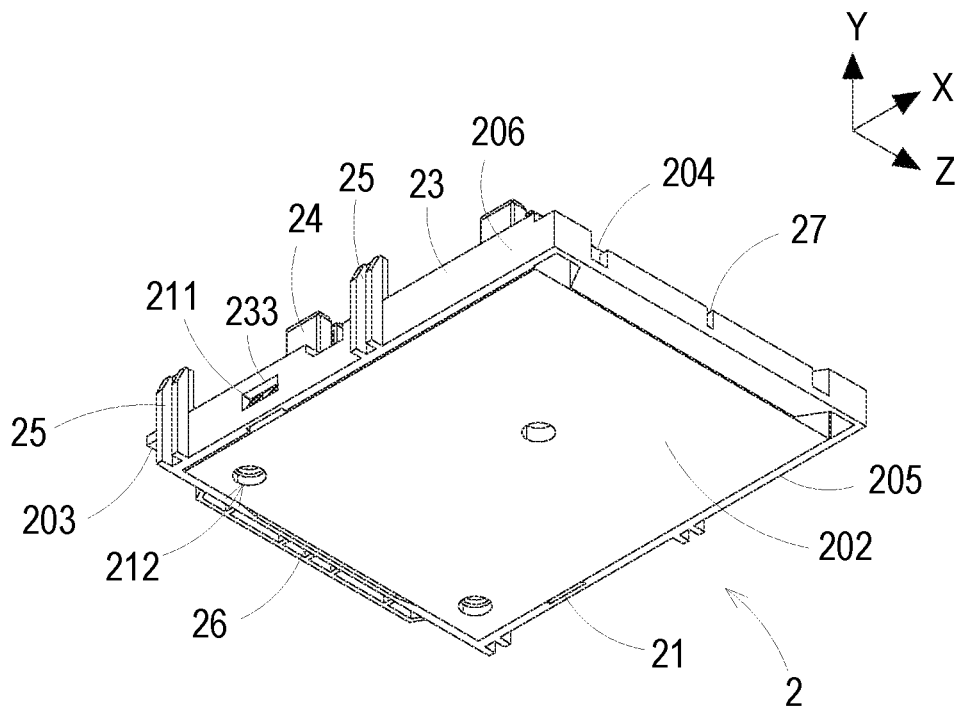
Figure 5:
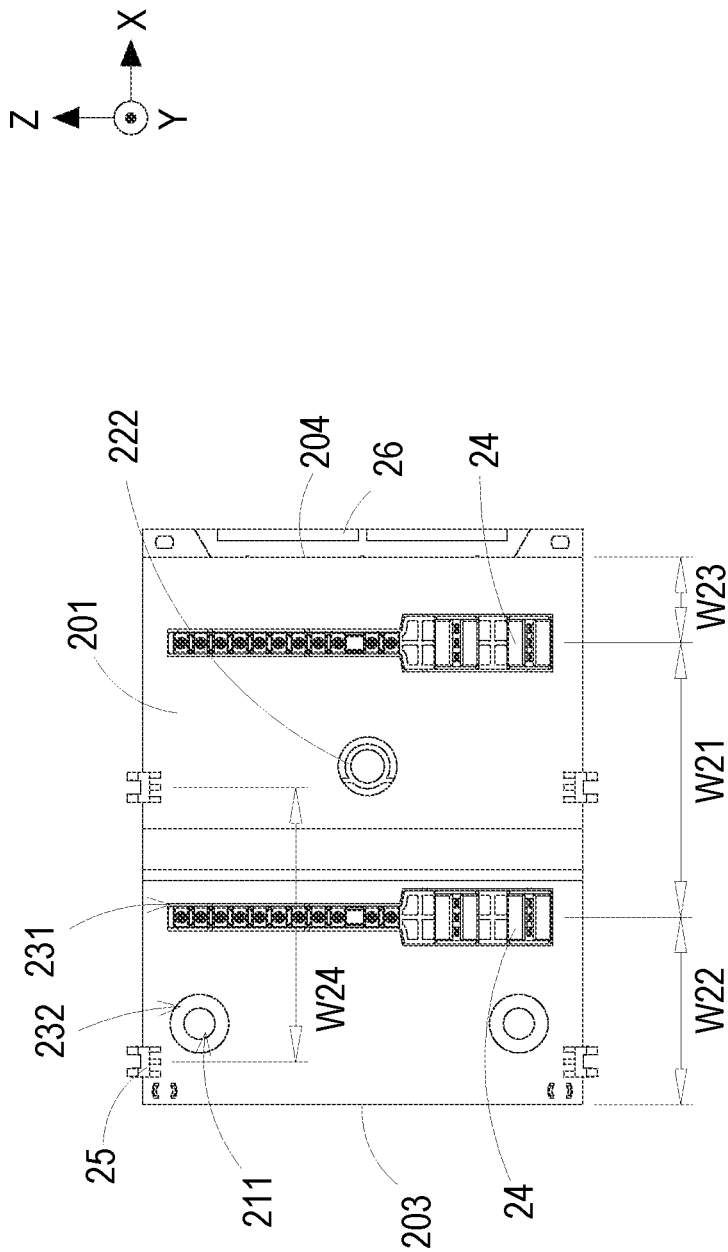
FIG. 5 is a front view illustrating the modular backplane structure according to the first embodiment of the present disclosure.

Please refer to FIGS. 3 to 5. In the embodiment, the modular backplane structure 2 includes a base 21, a circuit board 22, an outer cover 23 and N connectors 24. The circuit board 22 is disposed between the base 21 and the outer cover 23. In the embodiment, N=2. That is, two connecters are disposed on the circuit board 22. In other embodiments, N is an integer, and N>2. In other embodiments of the present disclosure, the N connectors 24 are arranged equidistantly in the first direction, such as the X axial direction. The outer cover 23 includes N openings 231 spatially corresponding to the N connectors 24. The outer cover 23, the circuit board 22 and the base 21 are stacked sequentially along the second direction, such as the Y axial direction. One side of the outer cover 23 forms the first surface 201 of the modular backplane structure 2, and one side of the base 21 forms the second surface 202 of the modular backplane structure 2. The first surface 201 and the second surface 202 are disposed opposite to each other in the second direction (i.e., the Y axial direction). In the embodiment, the outer cover 23 is connected to the base 21 to form the first backplane-lateral-side 203 and the second backplane-lateral-side 204 of the modular backplane structure 2. The first backplane-lateral-side 203 and the second backplane-lateral-side 204 are opposite to each other in the first direction (i.e., the X axial direction), and connected to each other through the first surface 201 and the second surface 202, Notably, in the embodiment, the present disclosure is not limited to the combination of the outer cover 23 and the base 21 and the manner of forming the first surface 201, the second surface 202, the first backplane-lateral-side 203 and the second backplane-lateral-side 204. In the embodiment, the N connectors 24 are protruded from the first surface 201 through the N openings 231, respectively. In the embodiment, the modular backplane structure 2 further includes a first connection element 26 and a second connection element 27 disposed on the first backplane-lateral-side 203 and the second backplane-lateral-side 204, respectively. In the embodiment, the first connection element 26 and the second connection element 27 includes structures corresponding to each other and capable of being matched and engaged with each other. In that, it allows the first connection element 26 being matched and engaged with the second connection element 27 of another modular backplane structure 2 in the second direction (i.e., the Y axial direction). In another embodiment, the second connection element 27 is mated and engaged with the first connection element 26 of another modular backplane structure 2 in the second direction, so as to combine the two modular backplane structures 2 (Referring to FIG. 13).

In the embodiment, the N connectors 24 are arranged equidistantly in the first direction (i.e., the X axial direction). Preferably but not exclusively, each two adjacent ones of the N connectors 24 have a first spaced distance W21 in the first direction, the first backplane-lateral-side 203 and the closest one of the N connectors 24 adjacent to the first backplane-lateral-side 203 have a second spaced distance W22, and the second backplane-lateral-side 204 and the closest one of the N connectors 24 adjacent to the second backplane-lateral-side 204 have a third spaced distance W23. In the embodiment, the first spaced distance W21 is equal to the sum of the second spaced distance W22 and the third spaced distance W23. In this way, two or more modular backplane structures 2 are spliced with each other along the second direction (i.e., the Y axial direction) through the first backplane-lateral-side 203 and the second backplane-lateral-side 204, and extended in the first direction (i.e., the X axial direction) (Referring to FIG. 13). The spaced distance between each two adjacent ones of the connectors 24 on the two or more modular backplane structures 2 is still maintained and equal to the first distance W21. Modular expansion applications can be realized. Certainly, the present disclosure is not limited thereto.

Figure 1A:
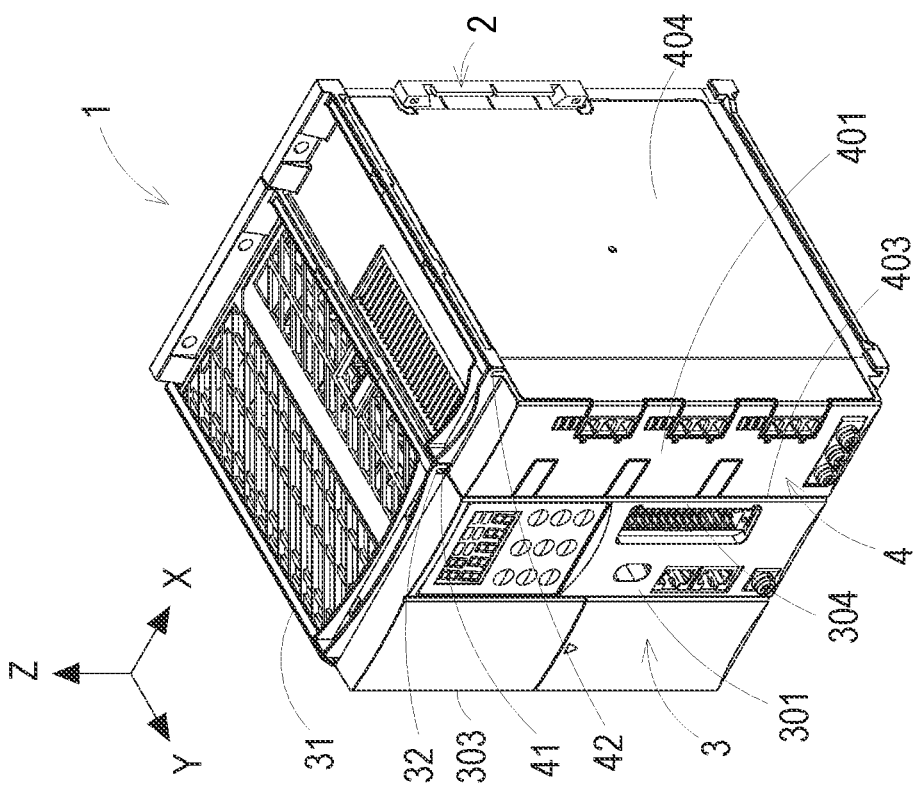
Figure 2A:
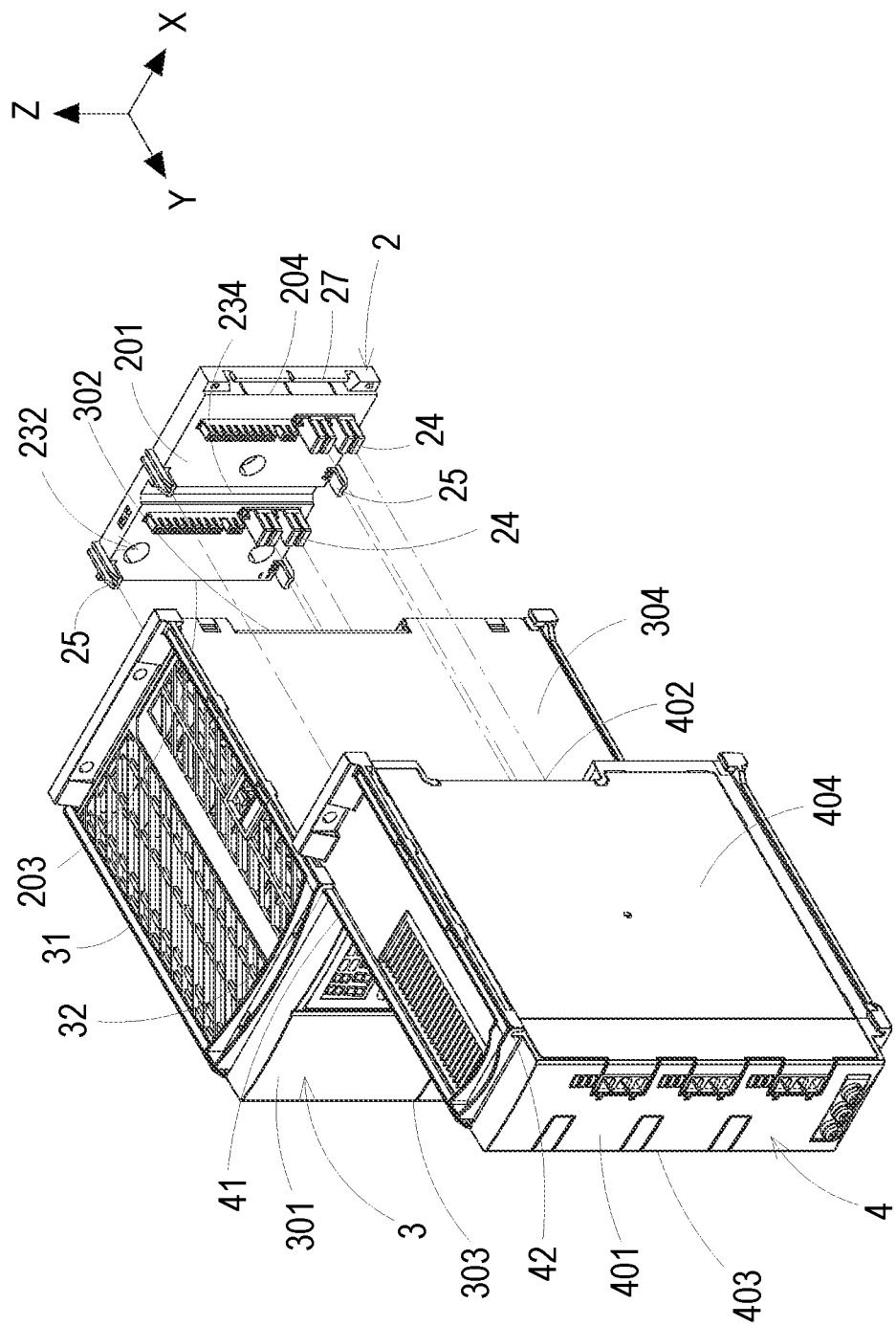
FIGS. 2A and 2B are exploded views illustrating the parallel module driver according to the first embodiment of the present disclosure.
Figure 2B:
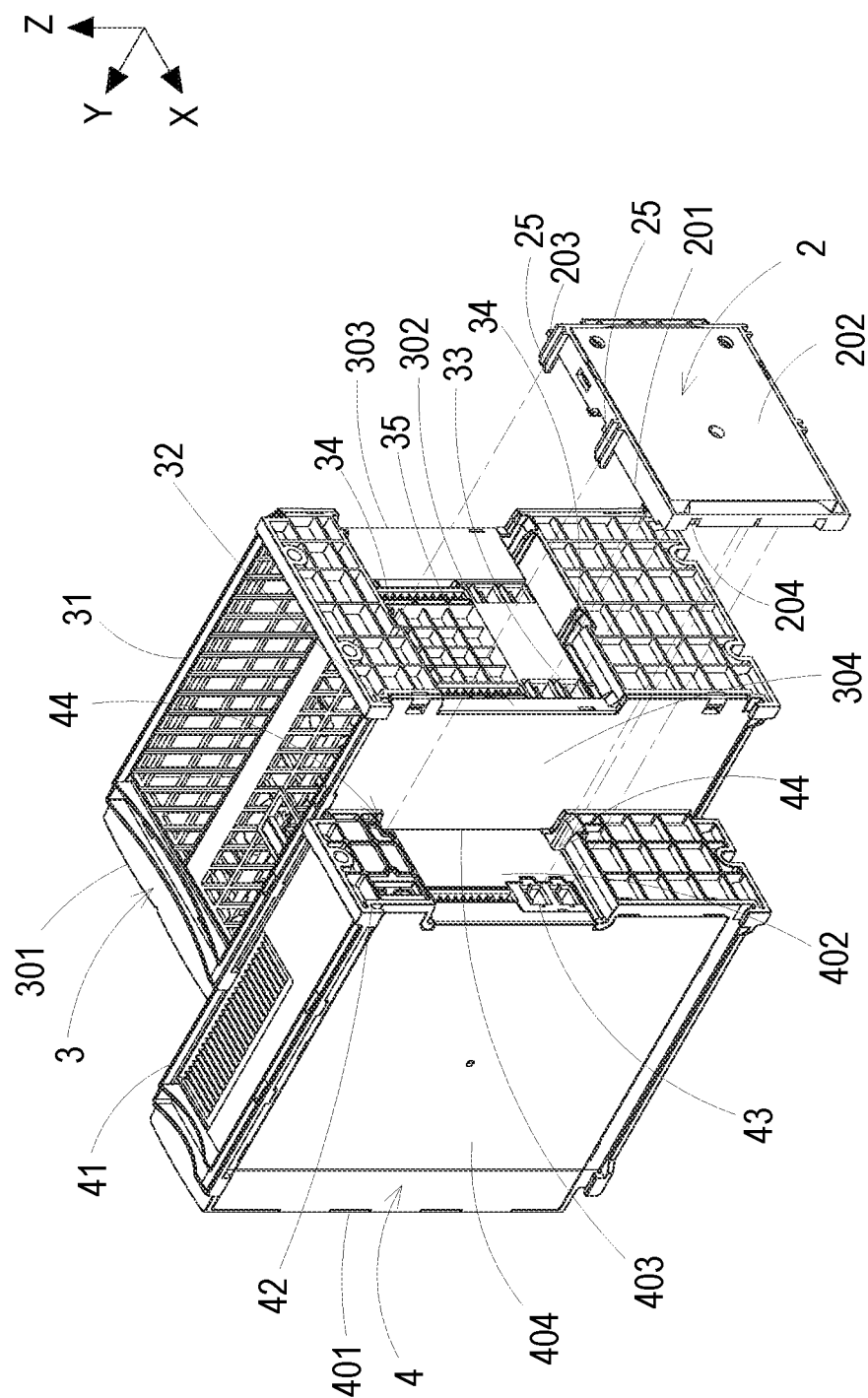
Figure 6B:
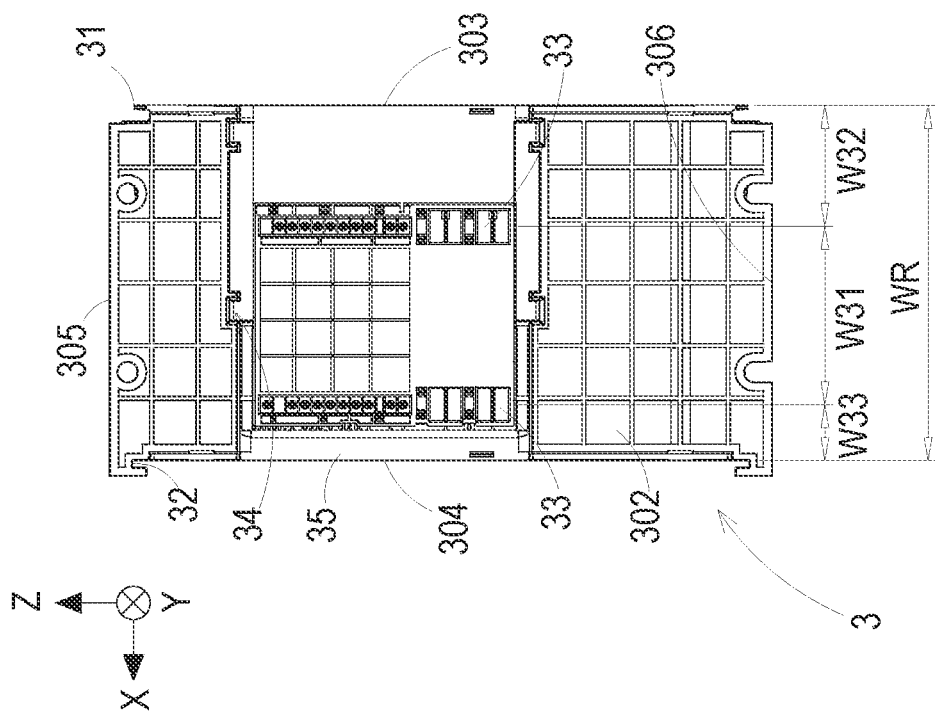
FIGS. 6A and 6B are a perspective structural view and a rear view illustrating the rectifier module according to the first embodiment of the present disclosure.
Figure 6A:
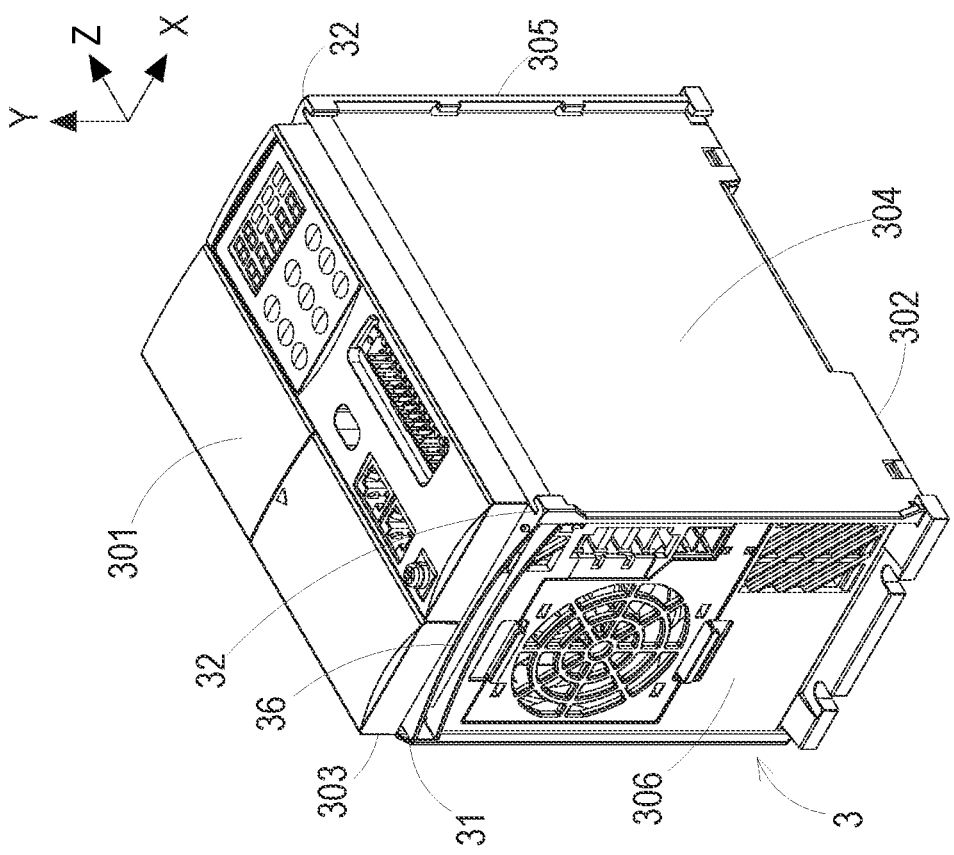
Figure 7B:
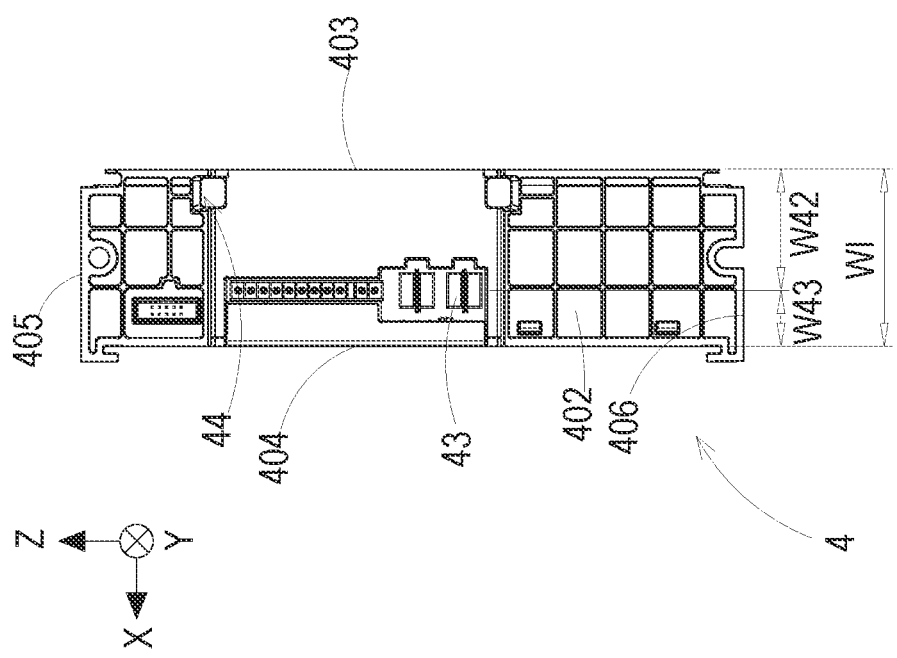
FIGS. 7A and 7B are a perspective structural view and a rear view illustrating the inverter module according to the first embodiment of the present disclosure.
Figure 7A:
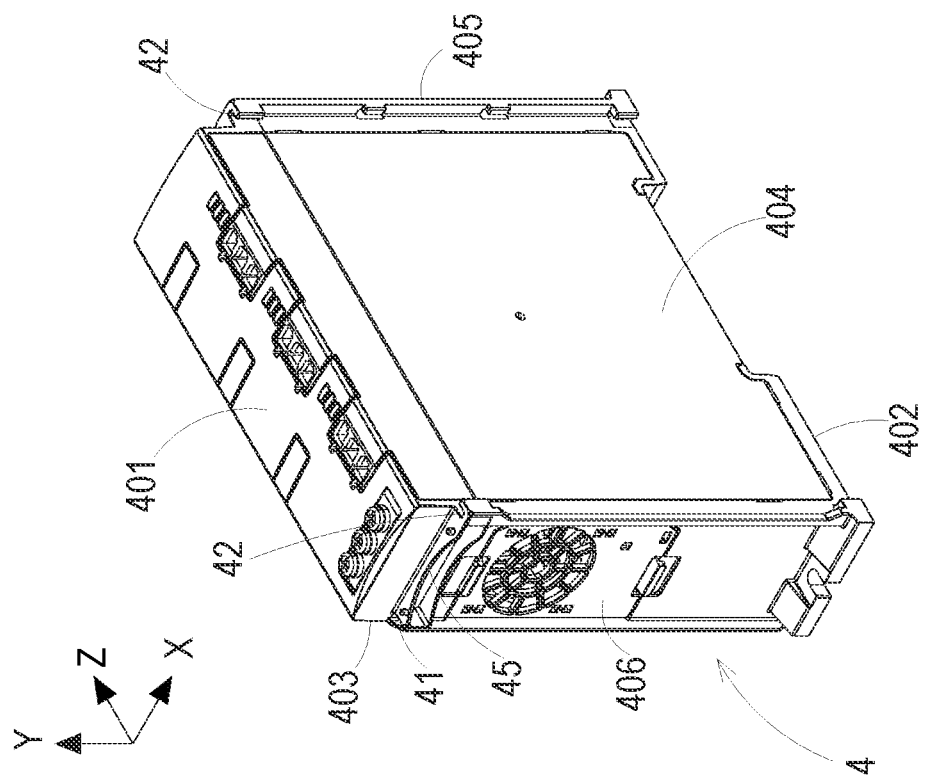

Please refer to FIGS. 1A and 6B. In the embodiment, the N connectors 24 are configured to connect with the rectifier-connection slot 33 of the at least one rectifier module 3 and the inverter-connection slot 43 of the at least one inverter module 4 in the second direction (i.e., the Y axial direction). In the embodiment, each two adjacent ones of the N connectors 24 on the modular backplane structure 2 have the first spaced distance W21 in the first direction. In addition, the first rectifier-lateral-side 303 and the second rectifier-lateral-side 304 of the rectifier module 3 have a rectifier width WR, and the rectifier width WR is twice of the first spaced distance W21. In the embodiment, the rectifier module 3 in the FIGS. 6A and 6B includes two rectifier-connection slots 33 located between the first rectifier-lateral-side 303 and the second rectifier-lateral-side 304. In the embodiment, a spaced distance of the two rectifier-connection slots 33 in the first direction (i.e., the X axial direction) is defined as a first spaced distance W31, equal to the first spaced distance W21 between each two adjacent ones of the connectors 24 on the modular backplane structure 2. Notably, the rectifier module 3 is electrically connected to the circuit board 22 of the modular backplane structure 2 by connecting any one of the two rectifier-connection slots 33 of the rectifier module 3 to the connector 24 of the modular backplane structure 2. Certainly, the two rectifier-connection slots 33 can also be connected to the two connectors 24, respectively. Through the control of the circuit board, the electrical effects are the same as that of one single rectifier-connection slot 33 connected to one single connector 24. The present disclosure is not limited thereto, and not redundantly described herein. In the embodiment, the first rectifier-lateral-side 303 of the rectifier module 3 and the closest one of the two rectifier-connection slots 33 adjacent to the first rectifier-lateral-side 303 have a second spaced distance W32. The second rectifier-lateral-side 304 of the rectifier module 3 and the closest one of the two rectifier-connection slots 33 adjacent to the second rectifier-lateral-side 304 have a third spaced distance W33. Preferably but not exclusively, the first spaced distance W21 between each two adjacent ones of the connectors 24 on the modular backplane structure 2 is equal to the first spaced distance W31 defined between the two rectifier-connection slots 33 in the first direction (i.e., the X axial direction). The first spaced distance W31 of the rectifier module 3 is equal to the sum of the second spaced distance W32 and the third spaced distance W33 of the rectifier module 3. Moreover, the rectifier width WR is twice of the first spaced distance W21, W31. Therefore, it allows adjusting the position of the rectifier module 3 or increase the quantity of the rectifier modules 3 on the modular backplane structure 2 according to the practical requirements, so as to realize the modular expansion applications.

In addition, please refer to FIGS. 1A to 7B. The first inverter-lateral-side 403 and the second inverter-lateral-side 404 of the inverter module 4 in FIGS. 7A and 7B have an inverter width WI, and the inverter width WI is equal to the first spaced distance W21 between each two adjacent ones of the connectors 24 on the modular backplane structure 2. In the embodiment, the first inverter-lateral-side 403 of the inverter module 4 and the inverter-connection slot 43 have a second spaced distance W42. The second inverter-lateral-side 404 of the inverter module 4 and the inverter-connection slot 43 have a third spaced distance W43. Preferably but not exclusively, the first spaced distance W21 between each two adjacent ones of the connectors 24 on the modular backplane structure 2 is equal to the inverter width WI, and also equal to the sum of the second spaced distance W42 and the third spaced distance W43 of the inverter module 4. Therefore, it allows adjusting the position of the inverter module 4 or increase the quantity of the inverter module 4 on the modular backplane structure 2 according to the practical requirements, so as to realize the modular expansion applications.

Please refer to FIGS. 1A to 8B. In the embodiment, the at least one rectifier module 3 further includes a rectifier-guiding element 31 and a rectifier-guiding groove 32, which are disposed on the first rectifier-lateral-side 303 and the second rectifier-lateral-side 304, respectively, and extended along the second direction (i.e., the Y axial direction). The at least one inverter module 4 further includes an inverter-guiding element 41 and an inverter-guiding groove 42, which are disposed on the first inverter-lateral-side 403 and the second inverter-lateral-side 404, respectively, and extended along the second direction (i.e., the Y axial direction). Preferably but not exclusively, in the embodiment, the rectifier-guiding element 31 and the inverter-guiding element 41 are the guiding ribs with the same structure. Preferably but not exclusively, the rectifier-guiding groove 32 and the inverter-guiding groove 42 are the guiding frames for matching with the guiding ribs, or includes a plurality of hooks for matching with the guiding ribs. In the embodiment, the rectifier-guiding element 31 is allowed matching with the inverter-guiding groove 42 or the rectifier-guiding groove 32 of the other rectifier module 3, so as to assemble and slide along the second direction (i.e., the Y axial direction). Moreover, the rectifier-guiding groove 32 is allowed matching with the inverter-guiding element 41 or the rectifier-guiding element 31 of the other rectifier module 3, so as to assemble or slide along the second direction (i.e., the Y axial direction). Similarly, the inverter-guiding element 41 is allowed matching with the rectifier-guiding groove 32 or the inverter-guiding groove 42 of the other inverter module 4, so as to assemble and slide along the second direction (i.e., the Y axial direction). Moreover, the inverter-guiding groove 42 is allowed matching with the rectifier-guiding element 31 or the inverter-guiding element 41 of the other inverter module 4, so as to assemble or slide along the second direction (i.e., the Y axial direction). Notably, with the arrangement of the rectifier-guiding element 31, the rectifier-guiding groove 32, the inverter-guiding element 41 and the inverter-guiding groove 42, the sliding direction of the rectifier module 3 and the inverter module 4 is limited in the second direction (i.e., the Y axial direction) when the rectifier module 3 and the inverter module 4 are installed, expanded or disassembled on the modular backplane structure 2. The rotation and swinging motion of the rectifier module 3 and inverter module 4 are avoided, so that the rectifier module 3 and inverter module 4 are installed, disassembled or replaced in the second direction (i.e., the Y axial direction). The disassembly and assembly the rectifier module 3 and the inverter module 4 are achieved in the linear actions, which is not regarded as a waste of the customer's cabinet space.

In the embodiment, the modular backplane structure 2 further includes a plural sets of positioning ribs 25, a third backplane-lateral-side 205 and a fourth backplane-lateral-side 206. The third backplane-lateral-side 205 and the fourth backplane-lateral-side 206 are opposite to each other and connected between the first backplane-lateral-side 203 and the second backplane-lateral-side 204, respectively. The plural sets of positioning ribs 25 are disposed adjacent to the third backplane-lateral-side 205 and the fourth backplane-lateral-side 206, respectively and configured to connect and match with one set of rectifier-positioning grooves 34 of the at least one rectifier 3 or one set of inverter-positioning grooves 44 of the at least one inverter module 4 in the second direction (i.e., the Y axial direction). In the embodiment, each two adjacent sets of the positioning ribs 25 have a fourth spaced distance W24, and the fourth spaced distance W24 is equal to the first spaced distance W21. In addition, the corresponding relationship of the positioning rib 25 relative to the first backplane-lateral-side 203 and the second backplane-lateral-side 204 is similar to the corresponding relationship of the connector 24 relative to the first backplane-lateral-side 203 and the second backplane-lateral-side 204, and not redundantly described herein. Similarly, the corresponding relationship of the rectifier-positioning groove 34 relative to the first rectifier-lateral-side 303 and the second rectifier-lateral-side 304 is similar to the corresponding relationship of the rectifier-connection slot 33 relative to the first rectifier-lateral-side 303 and the second rectifier-lateral-side 304, and the corresponding relationship of the inverter-positioning groove 44 relative to the first inverter-lateral-side 403 and the second inverter-lateral-side 404 is similar to the corresponding relationship of the inverter-connection slot 43 relative to the first inverter-lateral-side 403 and the second inverter-lateral-side 404, and not redundantly described herein. Notably, the rectifier-connection slot 33 of the at least one rectifier module 3 and the inverter-connection slot 43 of the at least one inverter module 4 are respectively docked to a corresponding one of the connectors 24 in the second direction (i.e., the Y axial direction) to form a first docking height H1. The rectifier-positioning groove 34 of the at least one rectifier module 3 and the inverter-positioning groove 44 of the at least one inverter module 4 are respectively docked to a corresponding one of the positioning ribs 25 in the second direction (i.e., the Y axial direction) to form a second docking height H2. The first docking height H1 is less than or equal to the second docking height H2. In that, when the rectifier module 3 and the inverter module 4 are installed in any position of the modular backplane structure 2, the pairing of the positioning rib 25 and the corresponding rectifier-positioning groove 34, and the paring of the positioning rib 25 and the inverter-positioning groove 44 are allowed to provide the alignment function. Moreover, it facilitates to prevent the connectors 24 from damage caused by different docking height when the rectifier module 3 and the inverter module 4 are installed on the modular backplane structure 2.

In the embodiment, the modular backplane structure 2 includes a recess 234, and one of the plurality of connectors 24 arranged closest to the first backplane-lateral-side 203 is disposed between the first backplane-lateral-side 203 and the recess 234. In the embodiment, the at least one rectifier module 3 includes a protruding block 35, and the rectifier-connection slot 33 is disposed between the first rectifier-lateral-side 303 and the protruding block 35. When the rectifier-connection slot 33 is connected to the connector 24 arranged closest to the first backplane-lateral-side 303 along the second direction (i.e., the Y axial direction), the recess 234 and the protruding block 35 are matched and engaged with each other. In that, a physical fool-proof effect is achieved when the rectifier module 3 is installed on the modular backplane structure 2. Certainly, the present disclosure is not limited thereto.

Furthermore, in the embodiment, the at least one rectifier module 3 further includes an arc-shaped block 36 arranged on a front surface 301 and upper edge 350 or a front surface 301 and lower edge 306 of the rectifier module 3, located between the first rectifier-lateral-side 303 and the second rectifier-lateral-side 304, and configured for a user to hold and apply force in the second direction (i.e., the Y axial direction), so as to move the rectifier module 3 in the second direction. In the embodiment, the at least one inverter module 4 further includes an arc-shaped block 45 arranged on a front surface 401 and upper edge 405 or a front surface 401 and lower edge 406, located between the first inverter-lateral-side 403 and the second inverter-lateral-side 404, and configured for a user to hold and apply force in the second direction (i.e., the Y axial direction), so as to move the inverter module 4 in the second direction. In other words, with the arrangement of the arc-shaped blocks 36, 45, it facilitates to provide a force application point when the user disassembles the rectifier module 3 and the inverter module 4 from the modular backplane structure 2 along the second direction. In the embodiment, the arc-shaped block 36, 45 further includes a plurality of protrusions disposed thereon for assembling and positioning accessories. Certainly, the present disclosure is not limited thereto.

Notably, in the embodiment, the arc-shaped block 36, 45 is extended to both sides of the rectifier module 3 or the inverter module, 4 and corresponding to the setting positions of the rectifier-guiding element 31, the inverter-guiding element 41, the rectifier-guiding groove 32 and the inverter-guiding groove 42, respectively. With the arrangement of the rectifier-guiding element 31, the inverter-guiding element 41, the rectifier-guiding groove 32 and the inverter-guiding groove 42, the sliding direction of the rectifier module 3 and the inverter module 4 is limited in the second direction (i.e., the Y axial direction) when the rectifier module 3 and the inverter module 4 are installed, expanded or disassembled on the modular backplane structure 2. The rotation and swinging motion of the rectifier module 3 and inverter module 4 are avoided, so that the rectifier module 3 and inverter module 4 are installed, disassembled or replaced in the second direction. The disassembly and assembly the rectifier module 3 and the inverter module 4 are achieved in the linear actions, which is not regarded as a waste of the customer's cabinet space. Furthermore, by matching the connector 24 with the rectifier-connection slot 33 or the inverter-connection slot 43 to dock, matching the rectifier-guiding element 31 and the inverter-guiding element 41 with the rectifier-guiding groove 32 and the inverter-guiding groove 42 to engage, matching the positioning rib 25 with the rectifier-positioning groove 34 or the inverter-positioning groove 44 to engage, and matching the protruding block 35 with the recess 234 to engage, it helps the user to complete the installation or disassembly action more quickly. Each of the matching engagements is a constraint relation, and it makes the rectifier module 3 and the inverter module 4 to be closely arranged when the rectifier module 3 and the inverter module 4 are expanded in parallel. When different modal amplitudes are generated by the different modules, the amplitudes are averaged effectively, so as to overcome more severe vibration environments.

Figure 8A:
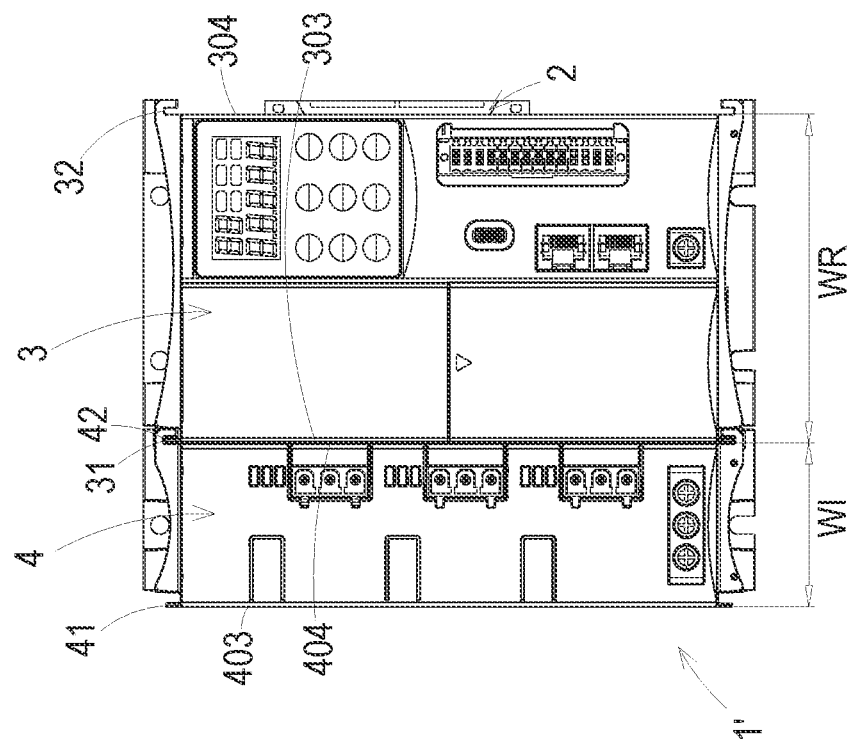
FIGS. 8A and 8B are front views illustrating the parallel module driver according to the first embodiment of the present disclosure.
Figure 8B:
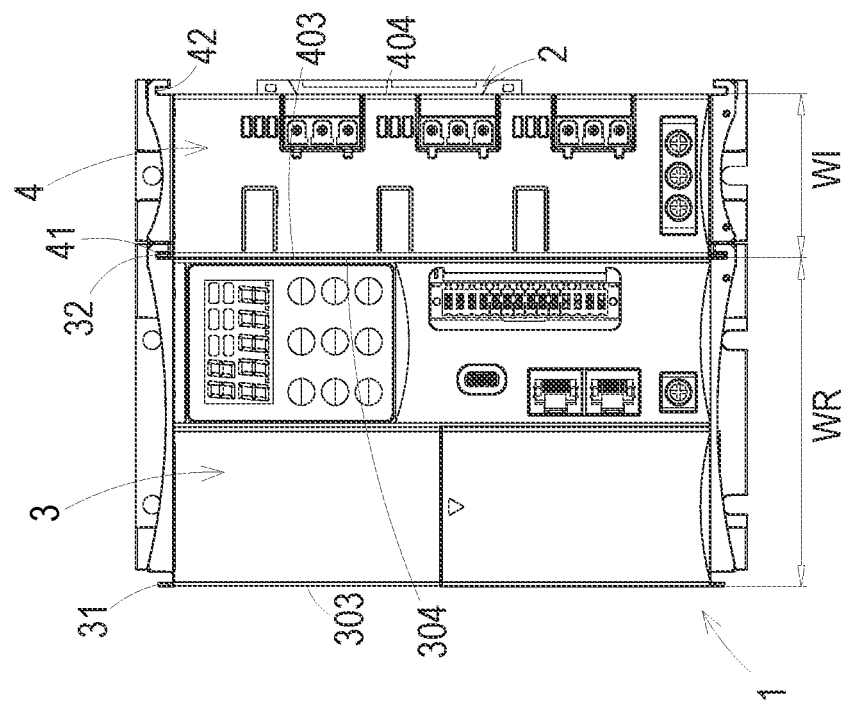

Please refer to FIGS. 1A to 8B. In the embodiment, the installation action and the assembling action of the modular backplane structure 2 are limited in the second direction (i.e., the Y axial direction). Furthermore, the rectifier module 3 and inverter module 4 are designed as book-type parallel modules, which are allowed to be plugged into or disassembled from the modular backplane structure 2 in the same second direction (i.e., the Y axial direction), so that the space utilization of electric control cabinet or equipment is increased effectively. In the embodiment, the rectifier module 3 and the inverter module 4 are arranged adjacent to each other, and the rectifier-connection slot 33 and the inverter-connection slot 43 are respectively connected to two adjacent connectors 24 on the modular backplane structure 2. Furthermore, by matching the rectifier-guiding groove 32 with the inverter-guiding element 41, the second rectifier-lateral-side 304 of the rectifier module 3 is attached to the first inverter-lateral-side 403 of the inverter module 4, and the rectifier module 3 and the inverter module 4 are inserted and disposed on the modular the backplane structure 2 and electrically connected to form the parallel module driver 1 as shown in FIG. 8A. In another embodiment, the inverter module 4 and the rectifier module 3 are matched through the rectifier-guiding element 31 and inverter-guiding groove 42, so that the first rectifier-lateral-side 303 of the rectifier module 3 is attached to the second inverter-lateral-side 404 of the inverter module 4, and the rectifier module 3 and the inverter module 4 are inserted and disposed on the modular the backplane structure 2 and electrically connected to form the parallel module driver 1' as shown in FIG. 8B. With such the structured parallel module drivers 1, 1', an AC input power is converted into a DC current by the rectifier module 3, and then the DC current is transmitted to each inverter module 4 through the modular backplane structure 2. Finally, the IGBT in the inverter module 4 converts the DC current into an AC output for the other motors. Since the electrical connection between the rectifier module 3 and the inverter module 4 is realized through the circuit board 22 in the modular backplane structure 2, it facilitates to solve the problems of the increased electrical impedance, the metal wear and the shrapnel deformation caused by the conventional connectors, thereby increasing the product reliability. In the parallel module drives 1, 1', the inverter module 4 is paralleled and expanded on either side of the rectifier module 3, and it facilitates to optimize the use of the customer's cabinet space. In other words, the arrangement and combination of the rectifier module 3 and the inverter module 4 arranged in parallel on the modular backplane structure 2 are adjustable according to the practical requirements, and implement the parallel expansion and applications.

Please refer to FIGS. 3 to 5. In the embodiment, the outer cover 23 includes a first engaging element 233, and the base 21 includes a second engaging element 211. The first engaging element 233 and the second engaging element 211 are spatially corresponding to each other. Preferably but not exclusively, the first engaging element 233 and the second engaging element 211 are a recess and a protrusion mated with each other, or a hook and a dovetail groove paired with each other. When the first engaging element 233 and the second engaging element 211 are engaged with each other, the outer cover 23 and the base 21 are combined into one piece, and the circuit board 22 is disposed between the outer cover 23 and the base 21. In other embodiments, the outer cover 23 and the base 21 are combined by spring, glue or magnetic connection to realize the combination of the outer cover 23 and the base 21, and form the first surface 201, the second surface 202, the first backplane-lateral-side 203 and the second backplane-lateral-side 204 of the modular backplane structure 2. In the embodiment, the outer cover 23 includes a first mounting hole 232, and the base 21 includes a second mounting hole 212. The first mounting hole 232 and the second mounting hole 212 are spatially corresponding to and in communication with each other, for mounting the modular backplane structure 2 on the wall of the electric control cabinet or equipment. Thereafter, it allows to insert and dispose the rectifier module 3 and the inverter module 4 on the modular the backplane structure 2 in the second direction (i.e., the Y axial direction), so that the book-type parallel module driver 1 of the present disclosure is achieved (Referring to FIGS. 1A to 1B). Certainly, the manner of mounting the modular backplane structure 2 on the electric control cabinet or equipment is adjustable, and not limited thereto. In an embodiment, the circuit board 22 includes a through hole 221 spatially corresponding to the first mounting hole 232 and the second mounting hole 212. With a fastening element (not shown) passing through the first mounting hole 232, the through hole 221 and the second mounting hole 212, the modular backplane structure 2 can be mounted on the wall of the electric control cabinet or equipment. In other embodiments, the meaning of connecting the plurality of connectors to the circuit board 22 or the meaning of clamping the circuit board 22 between the outer cover 23 and the base 21 are adjustable according to the practical requirements, and not limited thereto.

Please refer to FIGS. 1A to 8B. In the embodiment, the N connectors are in electrical connection through the copper bar of the circuit board 22. Since the rectifier module 3 and the inverter module 4 are electrically connected through the circuit board 22 and the corresponding connectors in the modular backplane structure 2, the rectifier-connection slot 33 of the rectifier module 3, the inverter-connection slot 43 of the inverter module 4 and the connectors 24 of the circuit board 22 can be equipped with grounding-signal connection interfaces. After the rectifier module 3, the inverter module 4 and the modular backplane structure 3 are assembled, the connectors 22 are conducted and used for transmission of system grounding signal. In other embodiments, the circuit board 22 includes a copper foil for heat dissipation. The circuit board 22 also includes a tin surface configured to mount the copper parts for increasing heat dissipation, or provide contacts for electrical conduction. The present disclosure is not limited thereto. In the embodiment, the circuit board 22 further includes a ground grommet 222 (with a through hole 221) spatially corresponding to the first mounting hole 232 and the second mounting hole 212. When the fastening element (not shown) passes through the first mounting hole 232, the through hole 221 of the ground grommet 222 and the second mounting hole 212 to mount the modular backplane structure 2 on the wall, a grounding circuit of the circuit board 222 and the wall is formed. In other words, the position of the ground grommet 222 can be added on the ground signal transmission path of the circuit board 22, and combined with the mounting operation of the modular backplane structure 2. It allows the customers to selectively mount the ground grommet 222 to the equipment of the customer's cabinet for the application environment with large interference, so as to increase the stability of the system grounding and further improve the competitiveness of the product. Certainly, the present disclosure is not limited thereto.

Figure 9:
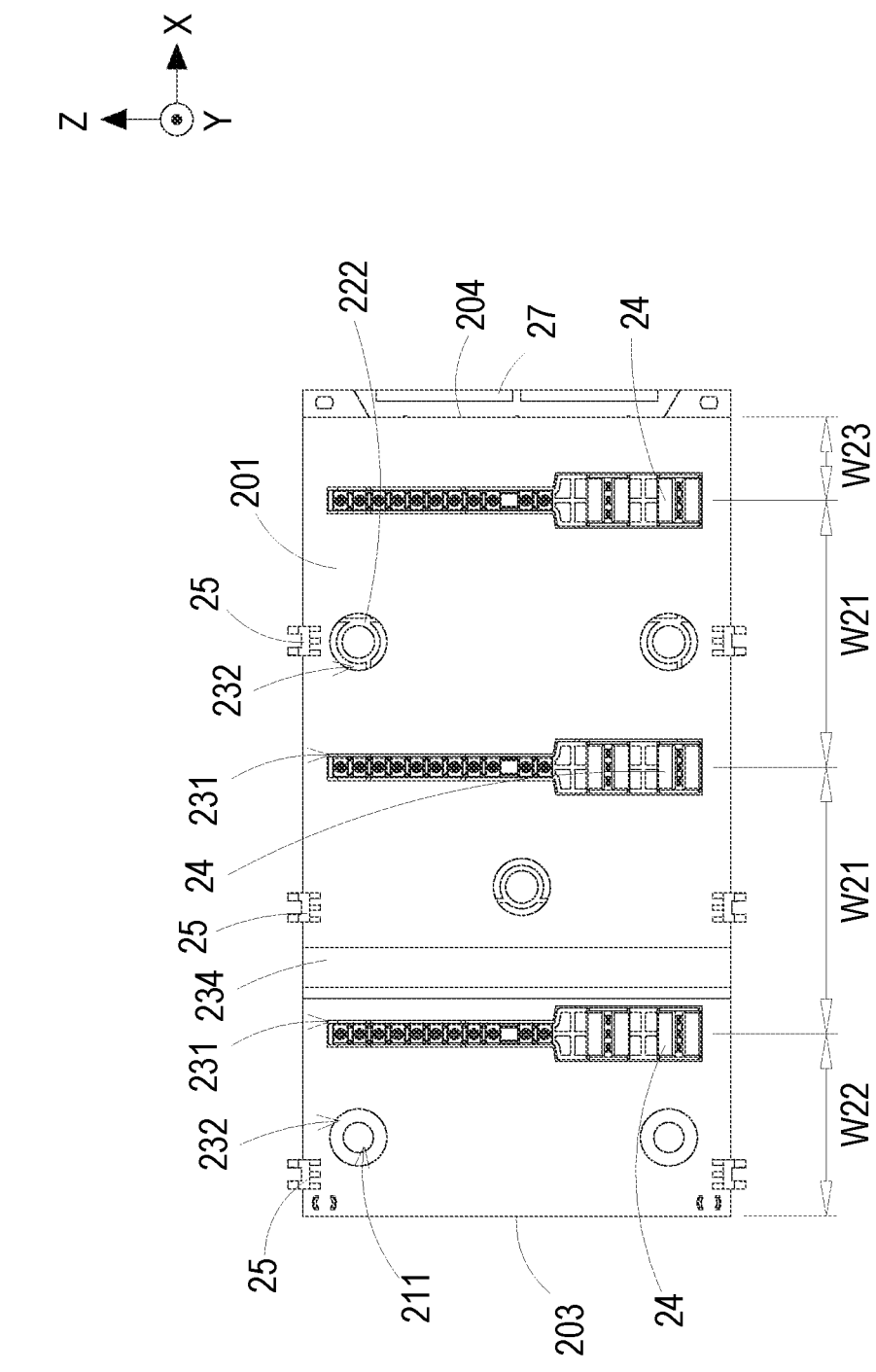
FIG. 9 is a front view illustrating a modular backplane structure according to a second embodiment of the present disclosure.
Figure 10A:
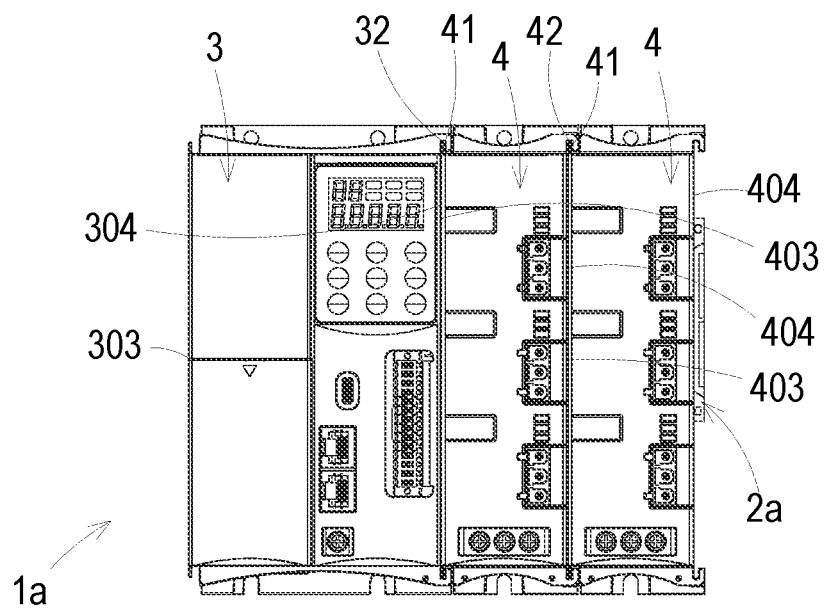
FIGS. 10A and 10B are front views illustrating the parallel module driver according to the second embodiment of the present disclosure.
Figure 10B:
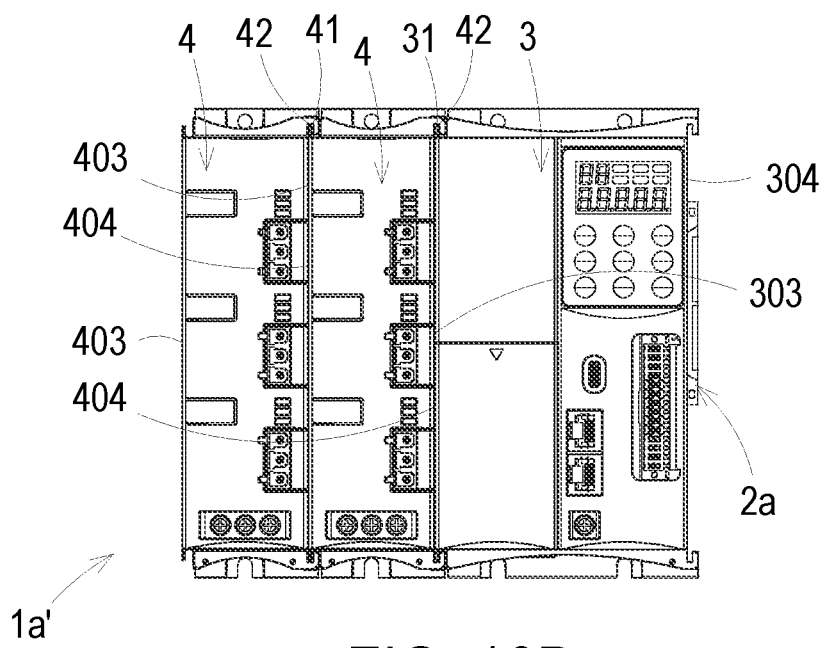

Please refer FIGS. 9 to 10B, which illustrate the parallel module drivers 1a, 1a' and the modular backplane structure 2a according to a second embodiment of the present disclosure. In the embodiment, the structures, elements and functions of the parallel module drivers 1a, 1a' and the modular backplane structure 2a are similar to those of the parallel module drivers 1, 1' and the modular backplane structure 2 of FIGS. 1A to 8B, and are not redundantly described herein. In the embodiment, three connectors 24 equidistantly arranged in the first direction (i.e., the X axial direction) are configured to connect with one rectifier module 3 and two inverter modules 4 in the second direction (i.e., the Y axial direction). In an embodiment, the rectifier module 3 is inserted and disposed on the connector 24 closest to the first backplane-lateral-side 203 on the modular backplane structure 2a, and the two inverter modules 4 are arranged side by side, and inserted and disposed on the other two connectors 24 on the modular backplane structure 2a. In that, the second rectifier-lateral-side 304 of the rectifier module 3 is attached to the outermost one of the first inverter-lateral-sides 403 of the of the two inverter modules 4, and the parallel module driver 1a shown in FIG. 10A is formed. In another embodiment, the rectifier module 3 is inserted and disposed on the connector 24 closest to the second backplane-lateral-side 204 on the modular backplane structure 2a, and the two inverter modules 4 are arranged side by side, and inserted and disposed on the other two connectors 24 on the modular backplane structure 2a. In that, the first rectifier-lateral-side 303 of the rectifier module 3 is attached to the outermost one of the second inverter-lateral-sides 404 of the of the two inverter modules 4, and the parallel module driver 1a' shown in FIG. 10B is formed. Since the electrical connection of the rectifier module 3 and the two inverter modules 4 are realized through the circuit board 22 in the modular backplane structure 2a, it facilitates to solve the problems of the increased electrical impedance, the metal wear and the shrapnel deformation caused by the conventional connectors, thereby increasing the product reliability. Certainly, in the parallel module drives 1a, 1a', the parallel arrangement of the rectifier module 3 and the inverter modules 4 are adjustable for the parallel expansion and applications. The present disclosure is not limited thereto.

Figure 11:
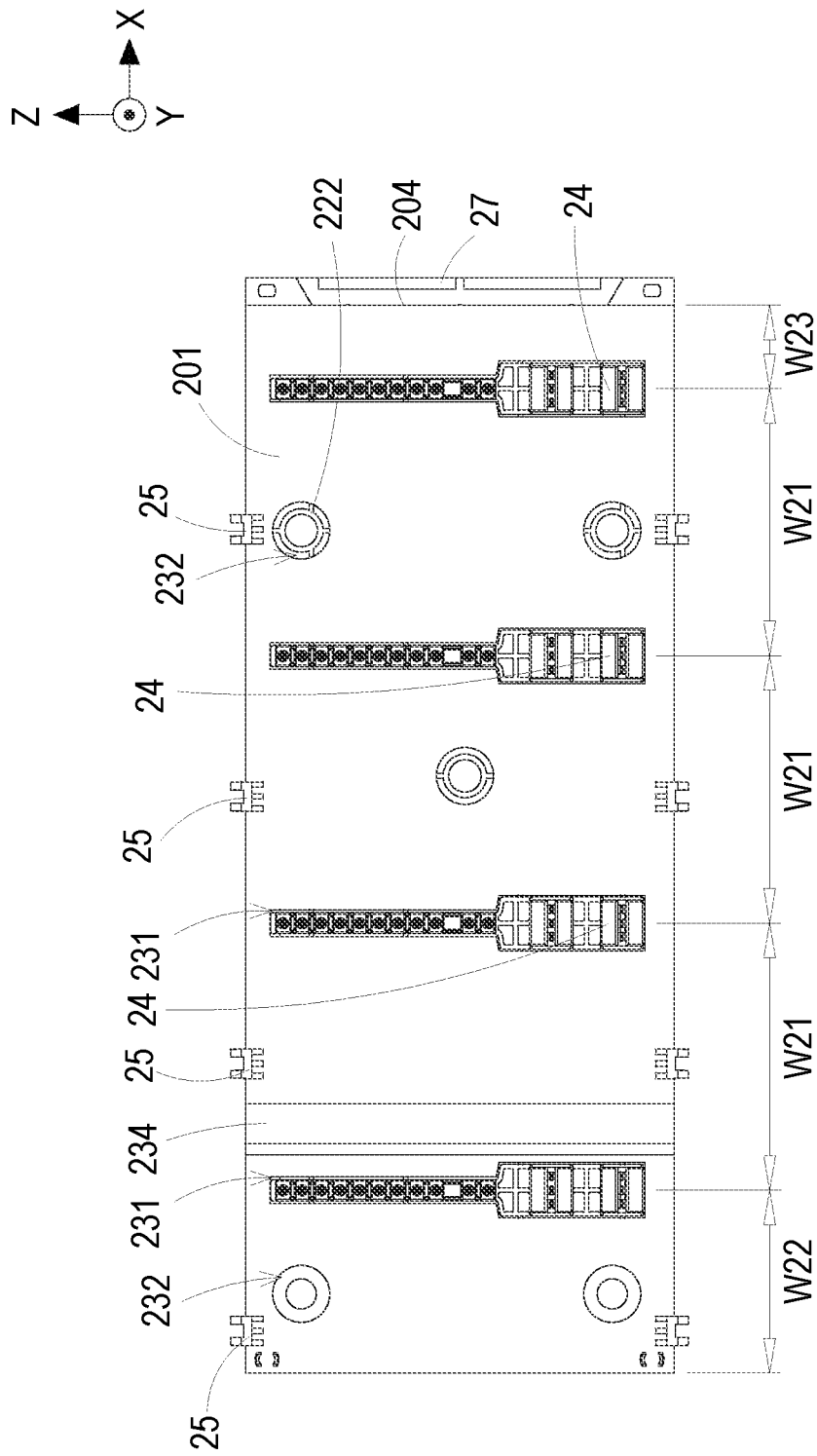
FIG. 11 is a front view illustrating a modular backplane structure according to a third embodiment of the present disclosure.
Figure 12A:
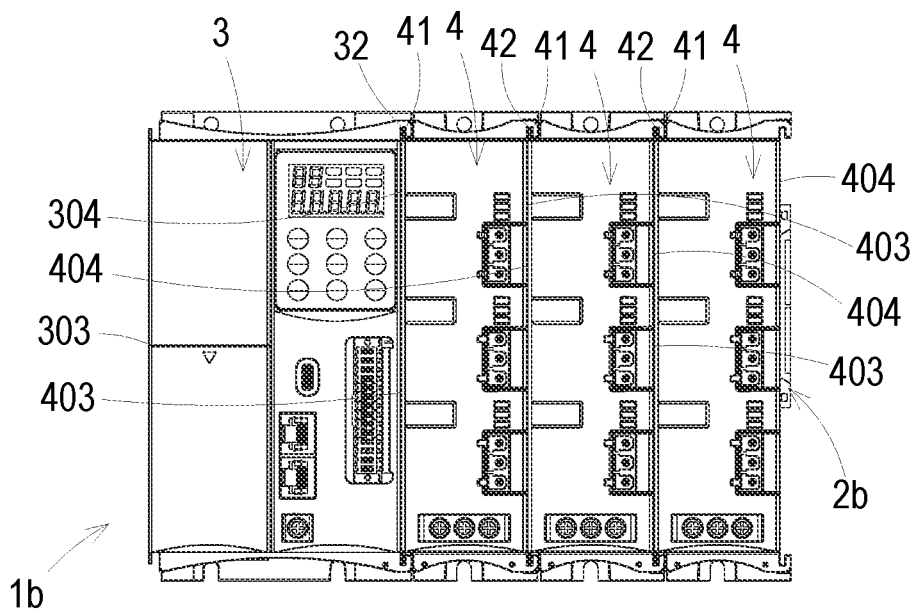
FIGS. 12A and 12B are front views illustrating the parallel module driver according to the third embodiment of the present disclosure.
Figure 12B:
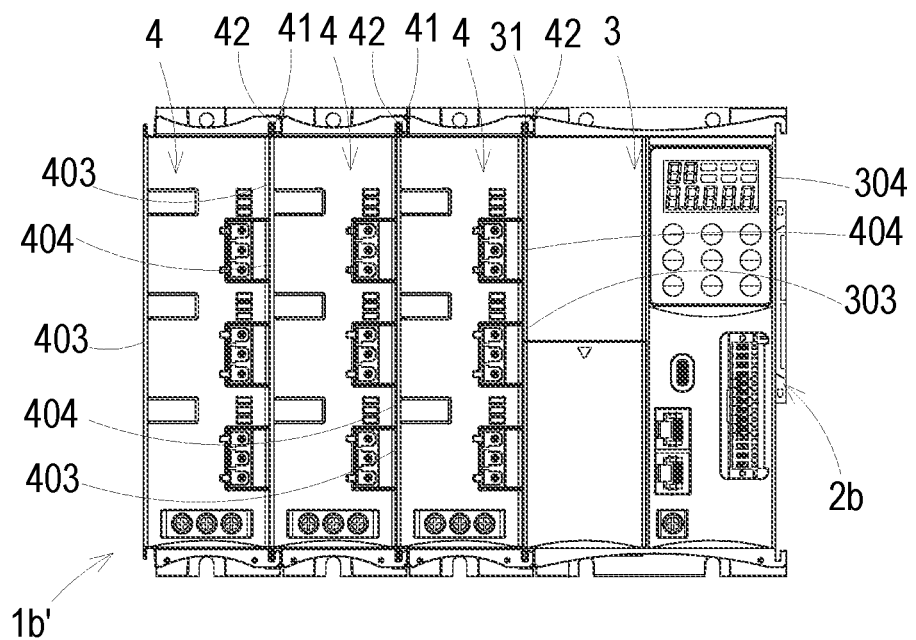

Please refer FIGS. 11 to 12B, which illustrate the parallel module drivers 1b, 1b' and the modular backplane structure 2b according to a third embodiment of the present disclosure. In the embodiment, the structures, elements and functions of the parallel module drivers 1*b*, 1*b*' and the modular backplane structure 2*b* are similar to those of the parallel module drivers 1, 1' and the modular backplane structure 2 of FIGS. 1A to 8B, and are not redundantly described herein. In the embodiment, four connectors 24 equidistantly arranged in the first direction (i.e., the X axial direction) are configured to connect with one rectifier module 3 and three inverter modules 4 in the second direction (i.e., the Y axial direction). In an embodiment, the rectifier module 3 is inserted and disposed on the connector 24 closest to the first backplane-lateral-side 203 on the modular backplane structure 2*b*, and the three inverter modules 4 are arranged side by side, and inserted and disposed on the other two connectors 24 on the modular backplane structure 2*b*. In that, the second rectifier-lateral-side 304 of the rectifier module 3 is attached to the outermost one of the first inverter-lateral-sides 403 of the of the three inverter modules 4, and the parallel module driver 1*b* shown in FIG. 12A is formed. In another embodiment, the rectifier module 3 is inserted and disposed on the connector 24 closest to the second backplane-lateral-side 204 on the modular backplane structure 2*a*, and the three inverter modules 4 are arranged side by side, and inserted and disposed on the other three connectors 24 on the modular backplane structure 2*b*. In that, the first rectifier-lateral-side 303 of the rectifier module 3 is attached to the outermost one of the second inverter-lateral-sides 404 of the of the two inverter modules 4, and the parallel module driver 1*b*' shown in FIG. 12B is formed. Since the electrical connection of the rectifier module 3 and the three inverter modules 4 are realized through the circuit board 22 in the modular backplane structure 2*b*, it facilitates to solve the problems of the increased electrical impedance, the metal wear and the shrapnel deformation caused by the conventional connectors, thereby increasing the product reliability. Certainly, in the parallel module drives 1*b*, 1*b*', the parallel arrangement of the rectifier module 3 and the inverter modules 4 are adjustable for the parallel expansion and applications. The present disclosure is not limited thereto.

Figure 13:
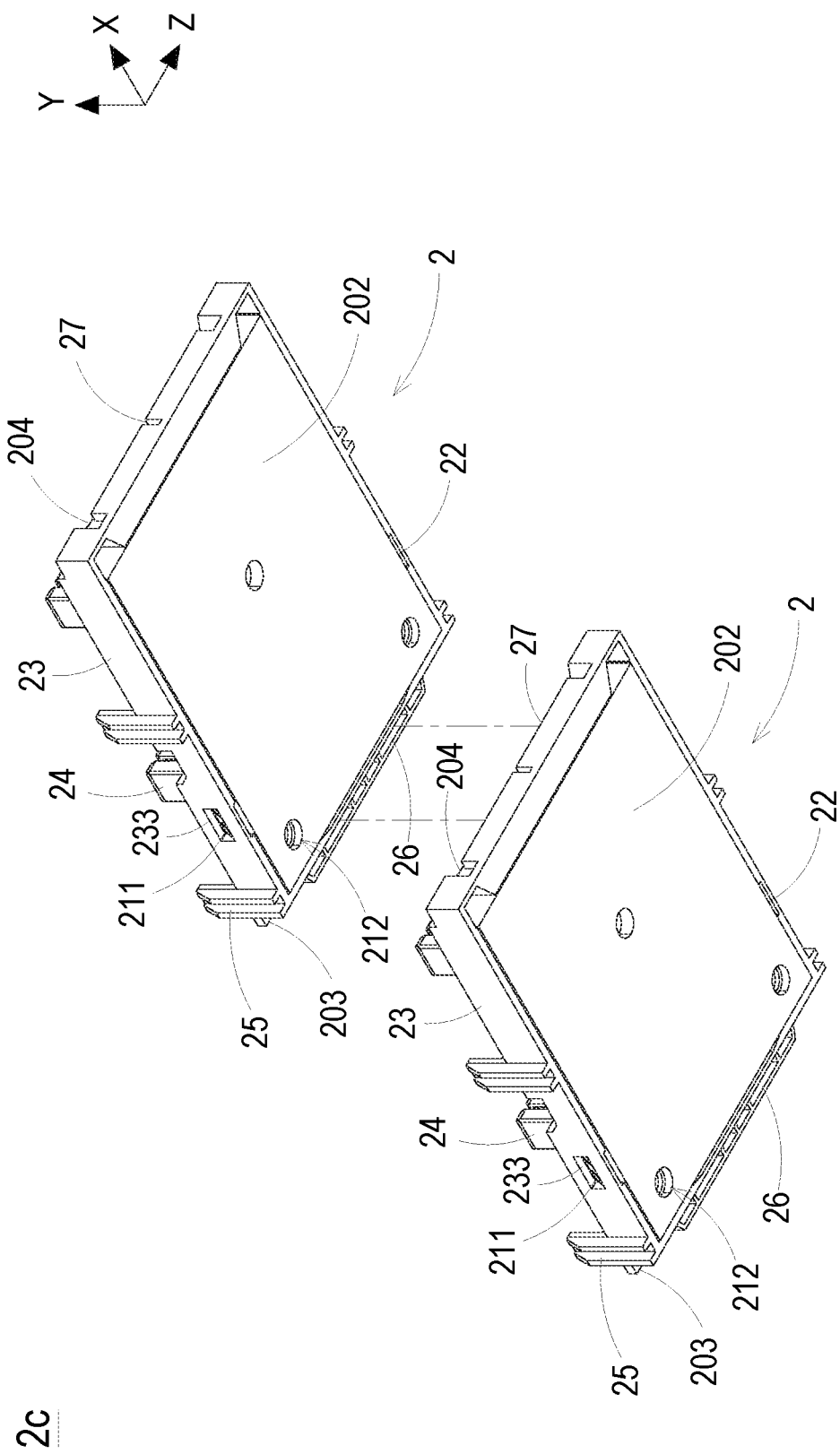
FIG. 13 is a perspective structural view illustrating an assembly of two modular backplane structures according to a fourth embodiment of the present disclosure.
Figure 14A:
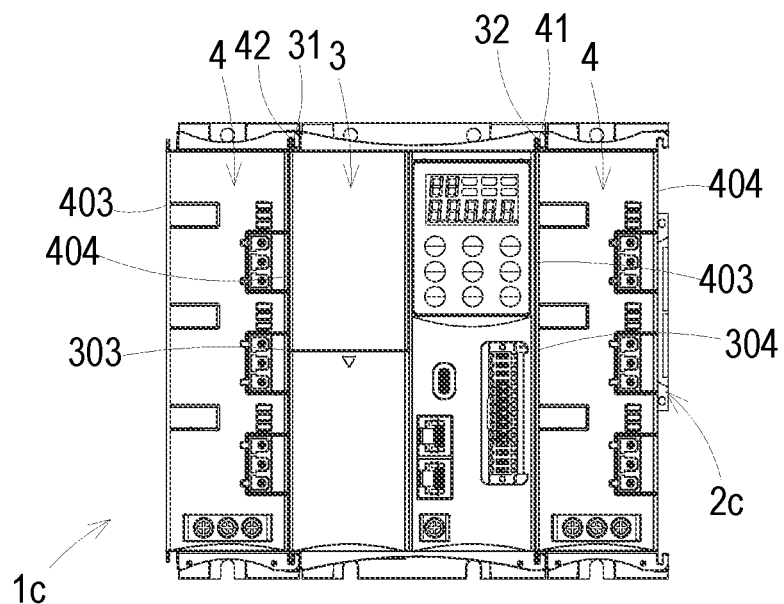
FIGS. 14A and 14B are front views illustrating the parallel module driver according to the fourth embodiment of the present disclosure.
Figure 14B:
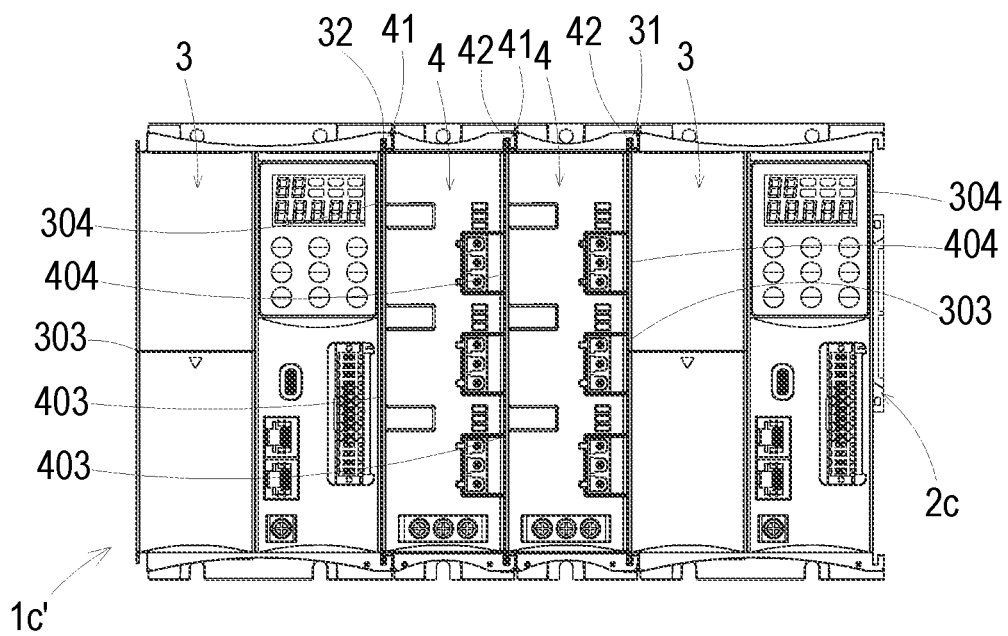

Please refer FIGS. 13 to 14B, which illustrate the parallel module drivers 1*c*, 1*c*' and the modular backplane structure 2*c* according to a fourth embodiment of the present disclosure. In the embodiment, the structures, elements and functions of the parallel module drivers 1*c*, 1*c*' and the modular backplane structure 2*c* are similar to those of the parallel module drivers 1, 1' and the modular backplane structure 2 of FIGS. 1A to 8B, and are not redundantly described herein. In the embodiment, the modular backplane structure 2*c* includes two modular backplane structures 2 spliced with each other along the second direction (i.e., the Y axial direction) and extended in the first direction (i.e., the X axial direction). In this way, the spliced modular backplane structure 2*c* includes four connectors 24 equidistantly arranged in the first direction (i.e., the X axial direction) and configured to connected with the rectifier modules 3 and the inverter modules 4 in the second direction (i.e., the Y axial direction). In an embodiment, the rectifier module 3 is inserted and disposed on two connectors 24 adjacent to the middle of the modular backplane structure 2*c*, and the two inverter modules 4 are inserted and disposed on the other two connectors 24 on the modular backplane structure 2*c*, respectively. In that, the first rectifier-lateral-side 303 and the second rectifier-lateral-side 304 of the rectifier module 3 are attached to one inverter module 4, respectively and the parallel module driver 1*c* shown in FIG. 14A is formed. In another embodiment, two inverter modules 4 are arranged side by side, and inserted and disposed on two connectors 24 adjacent to the middle of the modular backplane structure 2*c*, and the two rectifier modules 3 are inserted and disposed on the connector 24 adjacent to the first backplane-lateral-side 203 and the connector 24 on adjacent to the second backplane-lateral-side 204 on the modular backplane structure 2*c*, respectively. In that, the two inverter modules 4 are arranged side by side and located between the two rectifier modules, and the parallel module driver 1*c*' shown in FIG. 14B is formed. Notably, different from the parallel module drivers 1, 1', 1*a*, 1*a*', 1*b*, 1*b*' in the forgoing embodiments, in the embodiment, each inverter module 4 is only paralleled and expanded on one side of the rectifier module 3. Preferably but not exclusively, the two inverter modules 4 in the parallel module driver 1*c* are expanded on both sides of the rectifier module 3 at the same time. In this way, it helps to make the electrical coupling effect and signal transmission more stable, and reducing the influences of impedance and system parallel length at the same time. In addition, when a plurality of rectifier modules 3 are connected in parallel, a higher power input is provided to the inverter module 4, so that it allows to develop the application of the inverter module 4 towards the higher power application. Certainly, the present disclosure is not limited thereto.

Figure 15A:
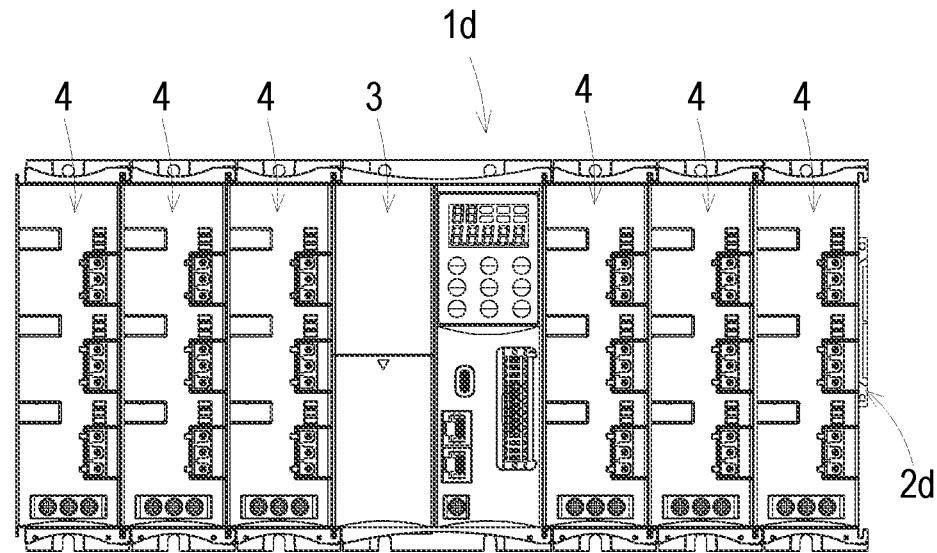
FIGS. 15A and 15B are front views illustrating the parallel module driver according to a fifth embodiment of the present disclosure.
Figure 15B:
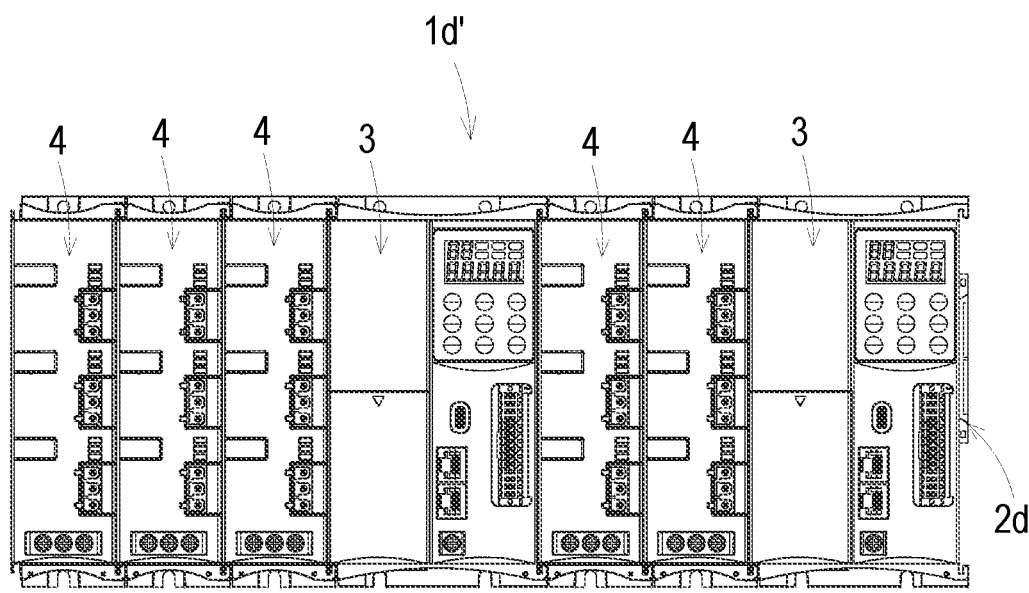

Please refer FIGS. 15A to 15B, which illustrate the parallel module drivers 1*d*, 1*d*' and the modular backplane structure 2*d* according to a fifth embodiment of the present disclosure. In the embodiment, the structures, elements and functions of the parallel module drivers 1*d*, 1*d*' and the modular backplane structure 2*d* are similar to those of the parallel module drivers 1*b*, 1*b*' and the modular backplane structure 2*b* of FIGS. 11 to 12B, and are not redundantly described herein. In the embodiment, the modular backplane structure 2*d* includes two modular backplane structures 2*b* spliced with each other along the second direction (i.e., the Y axial direction) and extended in the first direction (i.e., the X-axis direction). In this way, the spliced modular backplane structure 2*c* includes eight connectors 24 equidistantly arranged in the first direction (i.e., the X axial direction) and configured to connected with the rectifier modules 3 and the inverter modules 4 in the second direction (i.e., the Y axial direction). In an embodiment, the plurality of connectors 24 of the modular backplane structure 2*d* are configured to connect with one rectifier module 3 and six inverter modules 4. Preferably but not exclusively, three inverter modules 4 are arranged side by side and disposed adjacent to one side of the rectifier module 3, and the other three inverter modules 4 are arranged side by side and disposed adjacent to the other side of the combing module 3, and the parallel module driver 1*d* shown in FIG. 15A is formed. In an embodiment, the plurality of connectors 24 of the modular backplane structure 2*d* are configured to connect to two rectifier modules 3 and five inverter modules 4, and the parallel module driver 1*d*' shown in FIG. 15B is formed. In another embodiment, the plurality of connectors 24 of the modular backplane structure 2*d* are configured to connect with two rectifier modules 3 and five inverter modules 4. Certainly, in other embodiments, the numbers and arrangement of the rectifier modules 3 and the inverter modules 4 inserted in parallel and disposed on the modular backplane structure 2*d* are adjustable according to the practical requirements.

As can be seen from the above, it allows to splice the modular backplane structures 2~2*d* with each other in the second direction (i.e., the Y axial direction) and extended in the first direction (i.e., the X axial direction) according to the practical requirements, so as to form different numbers of the connectors 24 equidistantly arranged in the first direction (i.e., the X axial direction). Since the characteristic dimensions of the rectifier module 3 and the inverter module 4 are also designed according to the distance between any two adjacent connectors 24, it allows to adjust the numbers and the arrangement of the modular backplane structures 2-2d, the rectifier modules 3 and the inverter modules 4, so as to achieve the different application requirements the parallel module drivers 1~1d' be adjusted by using realized. Moreover, many of the above-mentioned technical features can be combined and changed according to the practical requirements. The present disclosure is not limited thereto and not redundantly described hereafter.

In summary, the present disclosure provides a modular backplane structure and a parallel module driver using the same. The installation and the assembly of the modular backplane structure are limited in a single direction. Furthermore, the rectifier module and inverter module are designed as book-type parallel modules, which are allowed to be plugged into or disassembled from the modular backplane structure in the same single direction, so that the space utilization of electric control cabinet or equipment is increased effectively. The modular backplane structure includes a plurality of connectors arranged thereon equidistantly in a first direction. It allows to combine more than two modular backplane structures with each other in the first direction, and then the equidistant arrangements of the plurality of connectors on two modular backplane structure are maintained. Corresponding to the plurality of connectors on the modular backplane structure, the sizes of at least one rectifier module and at least one inverter module are designed to have a multiple relationship with the distance between two adjacent connectors, so that it allows to install and connect the rectifier module and the inverter module to any two adjacent connectors of the modular backplane structure along a second direction, so as to form a parallel module driver arranged in the first direction. Furthermore, each of the rectifier module and the inverter module can be individually disassembled or replaced along the second direction. The inverter modules are arranged on one side or both sides of the rectifier module in the first direction for parallel expansion, and the number is not limited. With such a structured parallel module driver, an AC input power is converted into a DC current by the rectifier module, and then the DC current is transmitted to each inverter module through the modular backplane structure. Finally, the IGBT in the inverter module converts the DC current into an AC output for the other motors. Since the electrical connection between the rectifier module and the inverter module is realized through the circuit board in the modular backplane structure, it facilitates to solve the problems of the increased electrical impedance, the metal wear and the shrapnel deformation caused by the conventional connectors, thereby increasing the product reliability. In the parallel module drive, the inverter module is paralleled and expanded on either side of the rectifier module, and it facilitates to optimize the use of the customer's cabinet space. Preferably, when the inverter modules are expanded on both sides of the rectifier module at the same time, it is helpful of making the electrical coupling effect and signal transmission more stable, and reducing the influences of impedance and system parallel length at the same time. When a plurality of rectifier modules are connected in parallel, a higher power input is provided to the inverter module, so that it allows to develop the application of the inverter module towards the higher power application. On the other hand, the modular backplane structure further includes a plurality of positioning ribs arranged equidistantly and corresponding to the plurality of connectors, and the rectifier module and the inverter module includes the corresponding positioning grooves. Preferably, the docking height of docking each positioning rib to the corresponding positioning groove is greater than the docking height of docking each connector to corresponding the connection groove. In that, when the rectifier module and the inverter module are installed in any position of the modular backplane structure, the pairing of the positioning rib and the corresponding positioning groove is allowed to provide the alignment function. Moreover, it facilitates to prevent the connectors from damage when the rectifier module and the inverter module are installed on the modular backplane structure. The rectifier module includes a protruding block disposed on the surface corresponding to the modular backplane structure, and the protruding block is spatially corresponding to a recess of the modular backplane structure, so that a physical foolproof is achieved when the rectifier module is installed on the modular backplane structure. In addition, there are arc-shaped blocks disposed on the fronts of the rectifier module and the inverter module, and served as points of application for the user to disassemble the rectifier module and the inverter module from the modular backplane structure. The arc-shaped block further includes a plurality of protrusions disposed thereon for assembling and positioning accessories. The arc-shaped block is extended to both sides of the rectifier module or the inverter module, and corresponding to the setting positions of the guiding element and the guiding groove, respectively. With the arrangement of the guiding element and the guiding groove, the sliding direction of the rectifier module and the inverter module is limited when the rectifier module and the inverter module are installed, expanded or disassembled on the modular backplane structure. The rotation and swinging motion of the rectifier module and inverter module are avoided, so that the rectifier module and inverter module are installed, disassembled or replaced in the second direction. The disassembly and assembly the rectifier module and the inverter module are achieved in the linear actions, which is not regarded as a waste of the customer's cabinet space. Furthermore, by matching the guiding element with the guiding groove, the positioning rib with the positioning groove, and the protruding block with the recess, it helps the user to complete the installation or disassembly action more quickly. Each of the matching engagement between guiding element and the guiding groove, the matching engagement between the positioning rib and the positioning groove, and the matching engagement between the protruding block and the recess is a constraint relation, and it makes the rectifier module and the inverter module to be closely arranged when the rectifier module and the inverter module are expanded in parallel. When different modal amplitudes are generated by the different modules, the amplitudes are averaged effectively, so as to overcome more severe vibration environments. On the other hand, the modular backplane structure includes a base, a circuit board and an outer cover. The circuit board includes a plurality of connectors partially protruding through the outer cover for connecting the rectifier module and the inverter module to form a parallel module driver. The rectifier module and the inverter module are electrically connected through the circuit board and the connectors, and it facilitates to reduce the electrical impedance increased due to assembling. Since the rectifier module and the inverter module are electrically connected through the circuit board in the modular backplane structure, the connection slot of the rectifier module, the connection slot of the inverter module and the connectors of the circuit board are equipped with grounding-signal connection interfaces. After the three are assembled, the connectors are conducted and used for transmission of system grounding signal. Preferably, an additional ground grommet is added on the ground signal transmission path of the circuit board, and combined with the mounting operation of the modular backplane structure. It allows the customers to selectively mount the ground grommet to the equipment of the customer's cabinet for the application environment with large interference, so as to increase the stability of the system grounding and further improve the competitiveness of the product.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A parallel module driver comprising:
    a modular backplane structure comprising a first backplane-lateral-side, a second backplane-lateral-side, a first surface, a second surface and a plurality of connectors, wherein the first backplane-lateral-side and the second backplane-lateral-side are opposite to each other in a first direction, the first surface and the second surface are opposite to each other in a second direction, and the plurality of connectors are disposed on the first surface and arranged-equidistantly in the first direction;
    at least one rectifier module comprising a first rectifier-lateral-side, a second rectifier-lateral-side, a rectifier-connection slot, a rectifier-guiding element and a rectifier-guiding groove, wherein the first rectifier-lateral-side and the second rectifier-lateral-side are opposite to each other in the first direction, and the rectifier-connection slot is disposed on a rear surface of the rectifier module and located between the first rectifier-lateral-side and the second rectifier-lateral-side, and configured to dock with one of the connectors along the second direction; and
    at least one inverter module comprising a first inverter-lateral-side, a second inverter-lateral-side, an inverter-connection slot, an inverter-guiding element and an inverter-guiding groove, wherein the first inverter-lateral-side and the second inverter-lateral-side are opposite to each other in the first direction, and the inverter-connection slot is disposed on a rear surface of the inverter module and located between the first inverter-lateral-side and the second inverter-lateral-side, and configured to dock with one of the connectors along the second direction;
    wherein one of the at least one rectifier module and one of the at least one inverter module are disposed adjacent to each other, the rectifier-connection slot and the inverter-connection slot corresponding thereto are connected to two adjacent ones of the plurality of connectors on the modular backplane structure, respectively, the first rectifier-lateral-side and the second inverter-lateral-side are attached to each other, or the second rectifier-lateral-side and the first inverter-lateral-side are attached to each other;
    wherein the rectifier-guiding element and the rectifier-guiding groove are disposed on the first rectifier-lateral-side and the second rectifier-lateral-side, respectively, and extended along the second direction, and the inverter-guiding element and the inverter-guiding groove are disposed on the first inverter-lateral-side and the second inverter-lateral-side, respectively, and extended along the second direction, wherein the rectifier-guiding element is matched with the inverter-guiding groove or the rectifier-guiding groove is matched with the inverter-guiding element, so as to limit the rectifier module and the inverter module to assemble and slide in the second direction.

2. The parallel module driver according to claim 1, wherein each two adjacent ones of the connectors have a first spaced distance in the first direction, the first backplane-lateral-side and the closest one of the connectors adjacent to the first backplane-lateral-side have a second spaced distance, and the second backplane-lateral-side and the closest one of the connectors adjacent to the second backplane-lateral-side have a third spaced distance, wherein the first spaced distance is equal to the sum of the second spaced distance and the third spaced distance.

3. The parallel module driver according to claim 2, wherein the rectifier module comprises two rectifier-connection slots disposed on the rear surface of the rectifier module and located between the first rectifier-lateral-side and the second rectifier-lateral-side, wherein a spaced distance of the two rectifier-connection slots in the first direction is equal to the first spaced distance, the first rectifier-lateral-side and the second rectifier-lateral-side have a rectifier width, and the rectifier width is twice of the first spaced distance.

4. The parallel module driver according to claim 3, wherein the first rectifier-lateral-side and the closest one of the two rectifier-connection slots adjacent to the first rectifier-lateral-side have a spaced distance equal to the second spaced distance, and the second rectifier-lateral-side and the closest one of the two rectifier-connection slots adjacent to the second rectifier-lateral-side have a spaced distance equal to the third spaced distance.

5. The parallel module driver according to claim 2, wherein the first inverter-lateral-side and the second inverter-lateral-side have an inverter width, and the inverter width is equal to the first spaced distance.

6. The parallel module driver according to claim 5, wherein the first inverter-lateral-side and the inverter-connection slot have a spaced distance equal to the second spaced distance, and the second inverter-lateral-side and the inverter-connection slot have a spaced distance equal to the third spaced distance.

7. The parallel module driver according to claim 1, wherein the modular backplane structure comprises a recess, one of the plurality of connectors arranged closest to the first backplane-lateral-side is disposed between the first backplane-lateral-side and the recess, wherein the at least one rectifier module comprises a protruding block, and the rectifier-connection slot is disposed between the first rectifier-lateral-side and the protruding block, wherein when the rectifier-connection slot is connected to the connector arranged closest to the first backplane-lateral-side along the second direction, the recess and the protruding block are matched and engaged with each other.

8. The parallel module driver according to claim 1, wherein the modular backplane structure further comprises a first connection element and a second connection element disposed on the first backplane-lateral-side and the second backplane-lateral-side, respectively, the first connection element and the second connection element are corresponding to each other in structure, and the first connection element or the second connection element of the modular backplane structure allows to be matched and engaged with the second connection element or the first connection element of the other modular backplane structure, so as to combine two of the modular backplane structures.

9. The parallel module driver according to claim 1, wherein the modular backplane structure further comprises a plural sets of positioning ribs, a third backplane-lateral-side and a fourth backplane-lateral-side, the third backplane-lateral-side and the fourth backplane-lateral-side are opposite to each other and connected between the first backplane-lateral-side and the second backplane-lateral-side, respectively, the plural sets of positioning ribs are disposed adjacent to the third backplane-lateral-side and the fourth backplane-lateral-side respectively and configured to connect and match with one set of rectifier-positioning grooves of the at least one rectifier module or one set of inverter-positioning grooves of the at least one inverter module in the second direction.

10. The parallel module driver according to claim 9, wherein the rectifier-connection slot of the at least one rectifier module and the inverter-connection slot of the at least one inverter module are respectively docked to a corresponding one of the connectors in the second direction to form a first docking height, the rectifier-positioning groove of the at least one rectifier module and the inverter-positioning groove of the at least one inverter module are respectively docked to a corresponding one of the positioning ribs in the second direction to form a second docking height, and the first docking height is less than or equal to the second docking height.

11. The parallel module driver according to claim 1, wherein each two adjacent ones of the connectors have a first spaced distance in the first direction, the modular backplane structure further comprises a plural sets of positioning ribs, each two adjacent sets of the positioning ribs have a spaced distance equal to the first spaced distance.

12. The parallel module driver according to claim 1, wherein the at least one rectifier module further comprises an arc-shaped block arranged on a front upper edge or a front lower edge of the rectifier module, located between the first rectifier-lateral-side and the second rectifier-lateral-side, and configured for a user to hold and apply force in the second direction.

13. The parallel module driver according to claim 1, wherein the at least one inverter module further comprises an arc-shaped block arranged on a front upper edge or a front lower edge of the inverter module, located between the first inverter-lateral-side and the second inverter-lateral-side, and configured for a user to hold and apply force in the second direction.

14. The parallel module driver according to claim 1, each one of the rectifier-connection slot, the inverter-connection slot and the connectors has a grounding-signal-connection port disposed therein.

* * * * *